United States Patent
Panigot

(10) Patent No.: US 12,365,201 B2
(45) Date of Patent: Jul. 22, 2025

(54) COLLAPSIBLE SUPPORT STRUCTURE

(71) Applicant: Sunny Fold, LLC, Germantown, MD (US)

(72) Inventor: Joseph E. Panigot, Germantown, MD (US)

(73) Assignee: Sunny Fold, LLC, Germantown, MD (US)

( * ) Notice: Subject to any disclaimer, the term of this patent is extended or adjusted under 35 U.S.C. 154(b) by 299 days.

(21) Appl. No.: 18/096,292

(22) Filed: Jan. 12, 2023

(65) Prior Publication Data

US 2023/0219369 A1    Jul. 13, 2023

Related U.S. Application Data

(60) Provisional application No. 63/299,125, filed on Jan. 13, 2022.

(51) Int. Cl.
| | | |
|---|---|---|
| B60B 35/04 | (2006.01) | |
| B60B 35/00 | (2006.01) | |
| B62B 1/12 | (2006.01) | |
| B62B 1/20 | (2006.01) | |

(52) U.S. Cl.
CPC ............ B60B 35/04 (2013.01); B60B 35/004 (2013.01); B62B 1/12 (2013.01); B62B 1/208 (2013.01)

(58) Field of Classification Search
CPC ......... B60B 35/04; B60B 35/004; B62B 1/12; B62B 1/208
See application file for complete search history.

(56) References Cited

U.S. PATENT DOCUMENTS

| | | |
|---|---|---|
| 669,222 A | 3/1901 | Ruher |
| 908,472 A | 1/1909 | Lyons |
| 1,190,399 A | 7/1916 | Gates |

(Continued)

FOREIGN PATENT DOCUMENTS

| | | |
|---|---|---|
| EP | 1227025 A1 | 7/2002 |
| FR | 2692859 A1 | 12/1993 |

(Continued)

OTHER PUBLICATIONS

18" Seat Height Wooden Director's Chair with Black Canvas Seat, DISPLAYS2GO, https://www.displays2go.com/P-13749/Folding-Directors-Chair-Wood-Base-Trade-Shows-Promotional-Events?utm_source=google.pla&utm_medium=cpc&utm_campaign=GooglePLA&gclid=EAlalQobChMIhLfR5KaH4gIV0sDICh2lbwWCEAQYAiABEgJBjvD_BwE, 1 page (last accessed on May 16, 2019).

*Primary Examiner* — Bryan A Evans
(74) *Attorney, Agent, or Firm* — Edell, Shapiro & Finnan, LLC

(57) ABSTRACT

A collapsible support structure includes at least a horizontal support structure, a vertical support structure, and an axle assembly. In use, the collapsible support structure may be folded/unfolded between a deployed configuration, in which the collapsible support structure may be capable of rolling along a support surface to transport items, and a stowed/storage position, in which the collapsible support structure is collapsed in a compact geometry for storage. The axle assembly enables removal of the wheels from the axle for storage of the collapsible support structure. The axle may be repositionable between a deployed position and a storage position. The axle may be equipped with a retainer unit that retains the axle in the deployed position.

16 Claims, 26 Drawing Sheets

(56) References Cited

U.S. PATENT DOCUMENTS

| | | | |
|---|---|---|---|
| 2,287,117 A * | 6/1942 | Montalto | B65H 54/543 |
| | | | 403/324 |
| 2,556,814 A | 6/1951 | Love | |
| 2,757,937 A | 8/1956 | Illsley | |
| 2,802,672 A | 8/1957 | Edward | |
| 2,970,846 A | 2/1961 | Boston | |
| 2,992,011 A | 7/1961 | Becan | |
| 3,043,603 A | 7/1962 | Major, Sr. | |
| 3,083,995 A | 4/1963 | Bradshaw et al. | |
| 3,147,748 A | 9/1964 | Frank | |
| 3,166,339 A | 1/1965 | Earley | |
| 3,227,467 A | 1/1966 | Fugitt, Sr. | |
| 3,357,729 A | 12/1967 | Krueger | |
| 3,400,943 A | 9/1968 | Meiklejohn | |
| 3,424,474 A | 1/1969 | Karnow et al. | |
| 3,693,993 A | 9/1972 | Mazzarelli et al. | |
| 3,962,853 A | 6/1976 | Schwalm | |
| 4,114,916 A | 9/1978 | Oyama | |
| 4,262,928 A | 4/1981 | Leitzel | |
| 4,316,615 A | 2/1982 | Willette | |
| 4,323,260 A | 4/1982 | Suchy | |
| 4,355,818 A | 10/1982 | Watts | |
| 4,362,307 A | 12/1982 | Nakatani | |
| 4,362,308 A | 12/1982 | Hicks et al. | |
| 4,362,309 A | 12/1982 | Stamper | |
| 4,376,547 A | 3/1983 | Dominko | |
| 4,521,054 A | 6/1985 | Deconinck | |
| 4,537,421 A | 8/1985 | Teachout | |
| 4,561,674 A | 12/1985 | Alessio | |
| 4,618,157 A | 10/1986 | Resnick | |
| 4,645,262 A | 2/1987 | Furubotten | |
| 4,659,142 A | 4/1987 | Kuchinsky, Jr. | |
| 4,671,522 A | 6/1987 | Fragione, Jr. | |
| 4,715,650 A | 12/1987 | Berman et al. | |
| 4,733,905 A | 3/1988 | Buickerood et al. | |
| 4,773,708 A | 9/1988 | Nastu | |
| 4,790,559 A | 12/1988 | Edmonds | |
| 4,915,408 A | 4/1990 | Clemence et al. | |
| 5,040,807 A | 8/1991 | Snover | |
| 5,056,804 A | 10/1991 | Wilson et al. | |
| 5,072,958 A | 12/1991 | Young | |
| 5,106,112 A | 4/1992 | Sargent | |
| 5,176,393 A | 1/1993 | Robertson et al. | |
| 5,242,189 A | 9/1993 | Osaki | |
| 5,263,727 A | 11/1993 | Libit et al. | |
| 5,265,892 A | 11/1993 | Said | |
| 5,312,006 A | 5/1994 | Lag | |
| 5,330,212 A | 7/1994 | Gardner | |
| 5,364,112 A | 11/1994 | Jackson | |
| 5,395,163 A | 3/1995 | Mandell et al. | |
| 5,423,592 A | 6/1995 | Spurrier et al. | |
| 5,474,316 A | 12/1995 | Britton | |
| 5,492,347 A | 2/1996 | Palmeri et al. | |
| 5,499,894 A * | 3/1996 | Alto | F16B 13/0808 |
| | | | 411/340 |
| 5,667,163 A | 9/1997 | Sordahl | |
| 5,669,659 A | 9/1997 | Dittmer | |
| 5,673,928 A | 10/1997 | Jury | |
| 5,692,779 A | 12/1997 | Hedgepeth | |
| 5,803,471 A | 9/1998 | DeMars et al. | |
| 5,885,047 A | 3/1999 | Davis et al. | |
| 5,887,879 A | 3/1999 | Chumley | |
| 5,971,424 A | 10/1999 | Ingalls | |
| 5,979,921 A | 11/1999 | Derven et al. | |
| 6,042,122 A | 3/2000 | Mohr | |
| 6,042,128 A | 3/2000 | Dinkins | |
| 6,079,777 A | 6/2000 | Simmons et al. | |
| 6,164,683 A | 12/2000 | Kalman | |
| 6,186,520 B1 | 2/2001 | Barten | |
| 6,241,276 B1 | 6/2001 | Wilburn | |
| 6,283,496 B1 | 9/2001 | Dickmann | |
| 6,364,596 B1 | 4/2002 | Spencer et al. | |
| 6,375,200 B1 | 4/2002 | Harter | |
| 6,460,866 B1 | 10/2002 | Altschul et al. | |
| 6,471,236 B2 | 10/2002 | Eskridge | |
| 6,471,237 B1 | 10/2002 | Bedsole | |
| 6,474,856 B2 | 11/2002 | Billot | |
| 6,557,867 B1 | 5/2003 | Angstadt | |
| 6,581,945 B1 | 6/2003 | Shapiro | |
| 6,598,898 B2 | 7/2003 | Chu | |
| 6,626,453 B1 | 9/2003 | Theus et al. | |
| 6,663,120 B1 | 12/2003 | Fagerqvist | |
| 6,685,214 B2 | 2/2004 | Gregory | |
| 6,698,811 B1 * | 3/2004 | Schuchman | A61G 1/0225 |
| | | | 280/47.24 |
| 6,805,269 B2 * | 10/2004 | Lockard | A61G 1/0225 |
| | | | 280/30 |
| 6,808,186 B1 | 10/2004 | Su | |
| 6,811,180 B1 | 11/2004 | Molliere | |
| 6,845,991 B1 | 1/2005 | Ritucci et al. | |
| 6,874,799 B2 | 4/2005 | Robberson et al. | |
| 6,880,835 B2 | 4/2005 | Tornabene et al. | |
| 6,880,851 B1 | 4/2005 | Summers et al. | |
| 6,883,824 B2 | 4/2005 | Yang | |
| 6,886,836 B1 | 5/2005 | Wise | |
| 6,938,905 B1 | 9/2005 | Tsai | |
| 7,017,939 B2 | 3/2006 | Darling, III | |
| 7,025,363 B1 | 4/2006 | Leight | |
| 7,040,635 B1 | 5/2006 | Remole | |
| 7,172,207 B2 | 2/2007 | Henry | |
| 7,264,265 B2 | 9/2007 | Shapiro | |
| 7,316,407 B1 | 1/2008 | Elden | |
| 7,419,168 B2 * | 9/2008 | Felty | A63C 17/015 |
| | | | 280/87.041 |
| 7,448,632 B1 | 11/2008 | Neito | |
| 7,464,947 B2 | 12/2008 | Cortese | |
| 7,600,765 B2 | 10/2009 | Tsai | |
| 7,819,407 B1 | 10/2010 | Charitun | |
| 7,963,531 B2 | 6/2011 | Panigot | |
| 8,056,573 B2 | 11/2011 | Panigot | |
| 8,474,856 B2 | 2/2013 | Hawkes | |
| 8,608,188 B2 | 12/2013 | Goldszer | |
| 8,764,046 B2 | 7/2014 | Baldemor et al. | |
| 8,770,597 B1 | 7/2014 | Phillips | |
| 9,050,988 B1 | 6/2015 | McLeod | |
| 9,150,230 B2 | 10/2015 | Panigot | |
| 9,260,129 B2 | 2/2016 | Thompson | |
| 9,487,225 B1 | 11/2016 | Looman | |
| 9,598,095 B2 | 3/2017 | Panigot | |
| 10,059,357 B2 | 8/2018 | Panigot | |
| 10,448,471 B1 | 10/2019 | Panigot | |
| 11,400,965 B2 | 8/2022 | Panigot | |
| 2002/0096862 A1 | 7/2002 | Fang | |
| 2002/0163163 A1 | 11/2002 | Shapiro | |
| 2003/0015858 A1 * | 1/2003 | Chu | B62B 1/12 |
| | | | 280/47.26 |
| 2003/0034636 A1 | 2/2003 | Ng | |
| 2004/0046342 A1 | 3/2004 | Lin | |
| 2004/0080143 A1 | 4/2004 | Johnson | |
| 2004/0150195 A1 | 8/2004 | Robberson et al. | |
| 2005/0258621 A1 | 11/2005 | Johnson et al. | |
| 2006/0049614 A1 | 3/2006 | Shamah | |
| 2006/0061053 A1 | 3/2006 | Cortese | |
| 2006/0207831 A1 | 9/2006 | Moore et al. | |
| 2007/0194560 A1 | 8/2007 | Zink | |
| 2008/0272578 A1 | 11/2008 | Tsai | |
| 2008/0314300 A1 | 12/2008 | Bowsher | |
| 2009/0058047 A1 | 3/2009 | Brosh et al. | |
| 2009/0102248 A1 | 4/2009 | Grace et al. | |
| 2010/0044983 A1 | 2/2010 | Panigot | |
| 2010/0078907 A1 | 4/2010 | Voves | |
| 2010/0078912 A1 | 4/2010 | Chang et al. | |
| 2010/0229907 A1 | 9/2010 | Panigot | |
| 2010/0308563 A1 | 12/2010 | Martin | |
| 2011/0274526 A1 | 11/2011 | Kusick | |
| 2011/0291390 A1 | 12/2011 | Benimeli | |
| 2012/0038123 A1 | 2/2012 | Li | |
| 2012/0153587 A1 | 6/2012 | Ryan | |
| 2012/0160576 A1 | 6/2012 | Anasiewicz | |
| 2012/0160577 A1 | 6/2012 | Anasiewicz | |
| 2012/0211038 A1 | 8/2012 | Pirshafiey et al. | |
| 2012/0217727 A1 | 8/2012 | Lee | |
| 2013/0049333 A1 | 2/2013 | Yang | |
| 2013/0147164 A1 | 6/2013 | Cooper | |

(56) References Cited

U.S. PATENT DOCUMENTS

| | | |
|---|---|---|
| 2013/0153322 A1 | 6/2013 | Constin |
| 2014/0097599 A1 | 4/2014 | Panigot |
| 2014/0246837 A1 | 9/2014 | Delattre et al. |
| 2015/0123361 A1 | 5/2015 | Willett |
| 2016/0039441 A1 | 2/2016 | Panigot |
| 2016/0257327 A1 | 9/2016 | Gayk, Jr. et al. |
| 2017/0166230 A1 | 6/2017 | Panigot |
| 2019/0254432 A1 | 8/2019 | Panigot |
| 2021/0009176 A1 | 1/2021 | Panigot |

FOREIGN PATENT DOCUMENTS

| | | |
|---|---|---|
| WO | 03/049986 A2 | 6/2003 |
| WO | 2006/022614 A1 | 3/2006 |

* cited by examiner

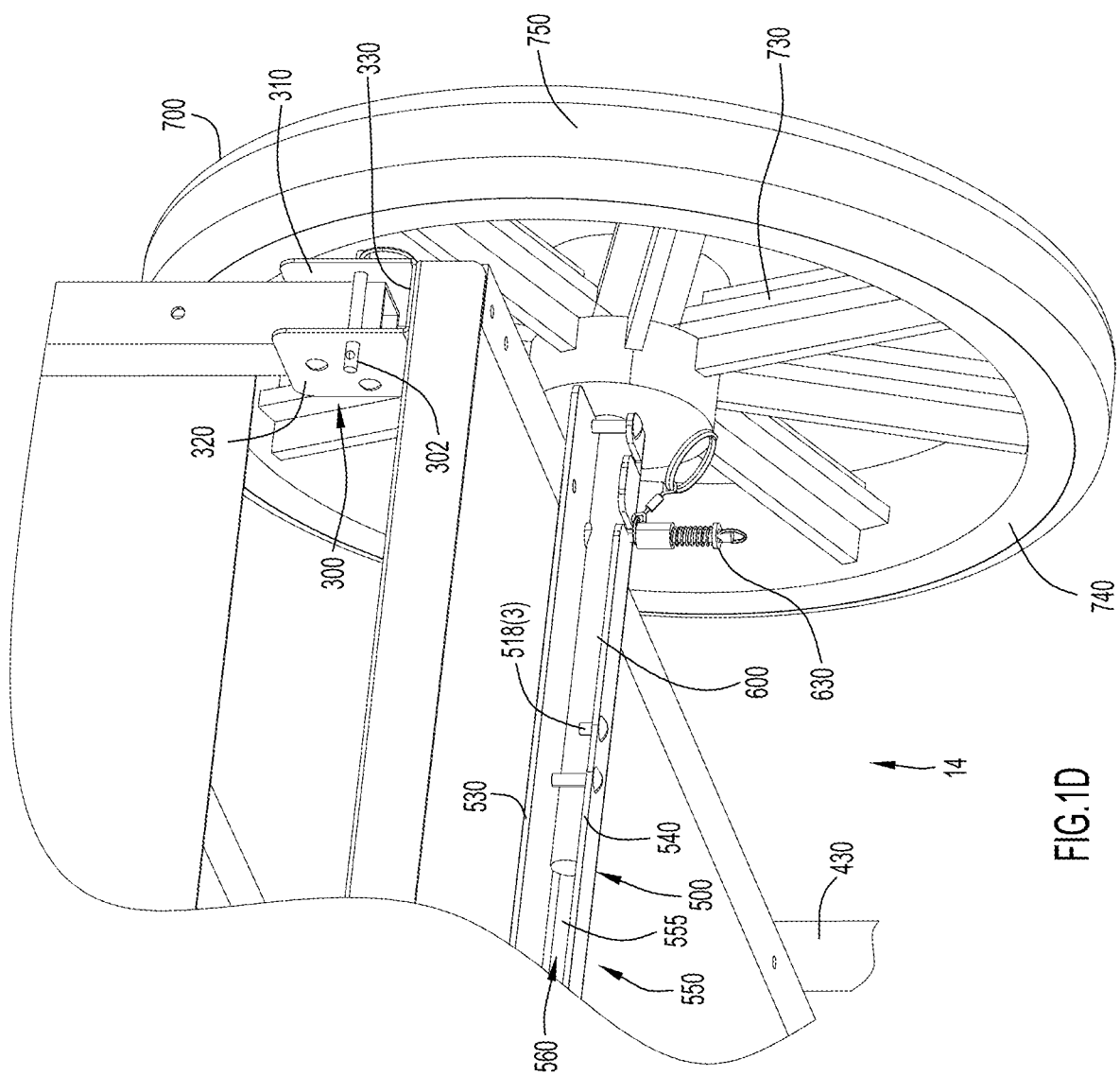

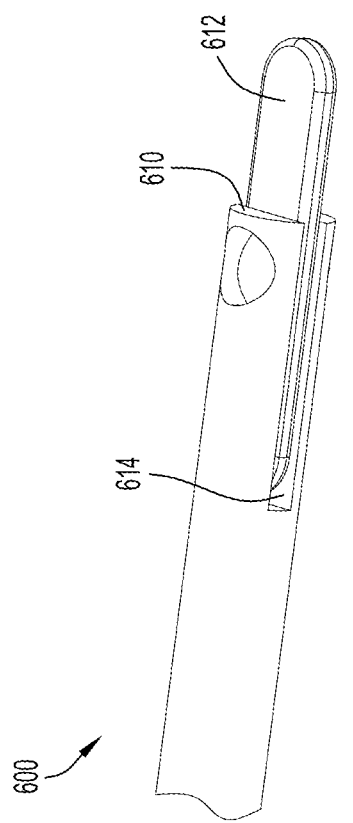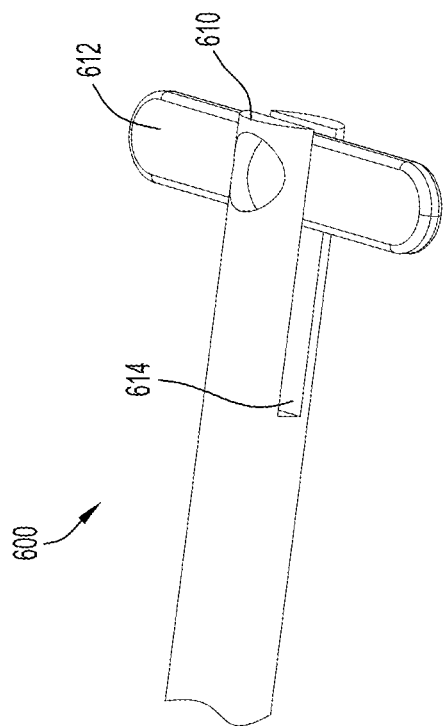

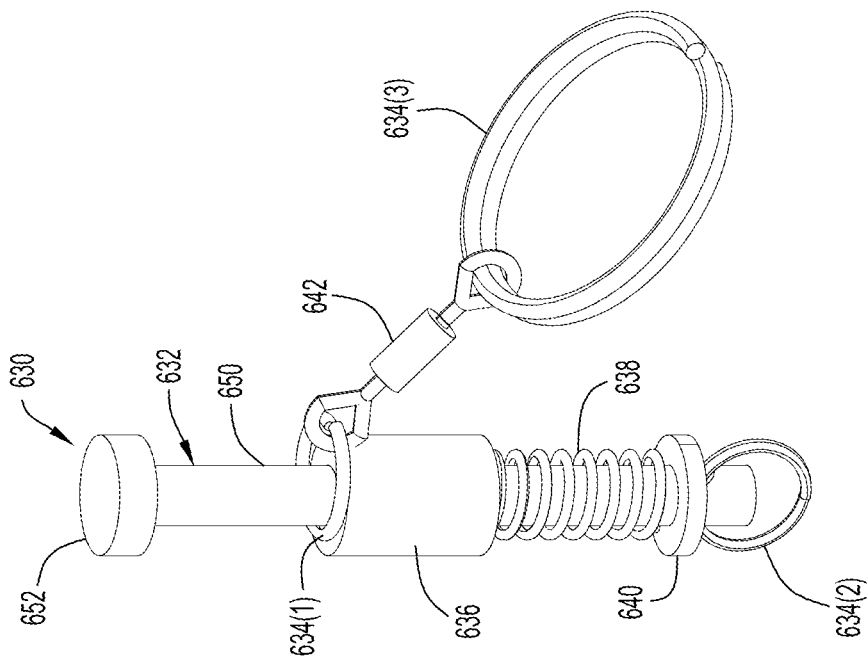
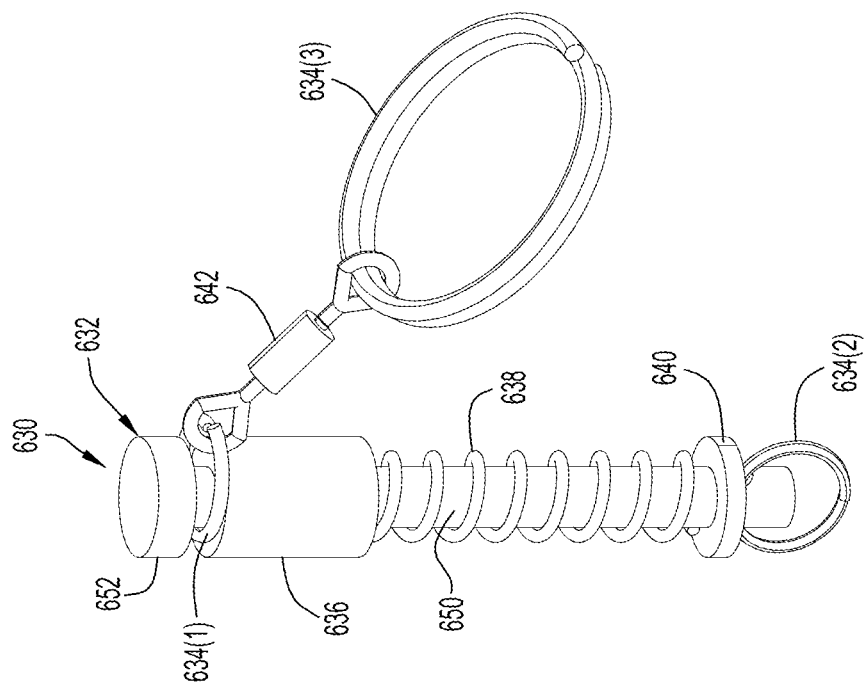

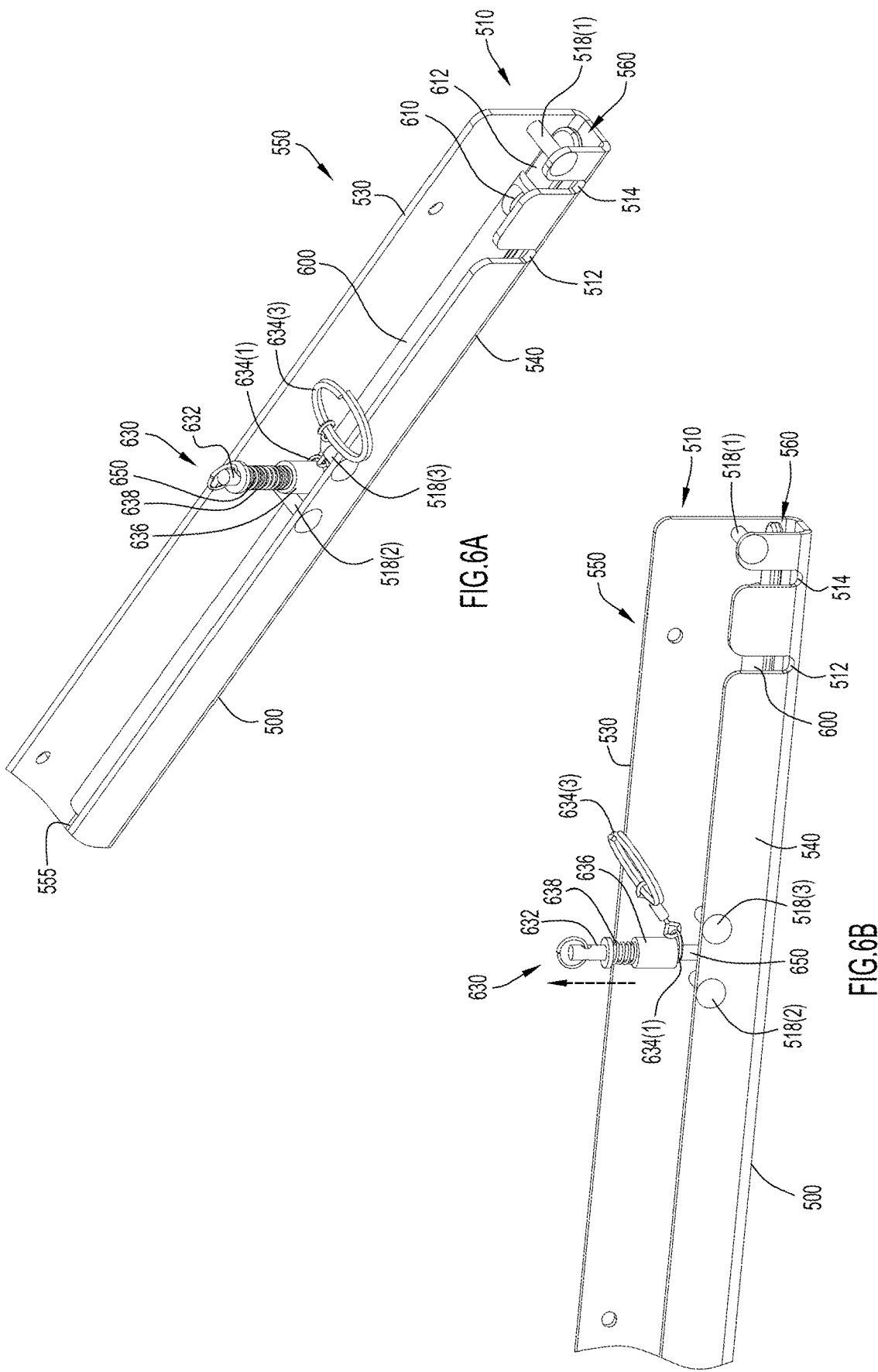

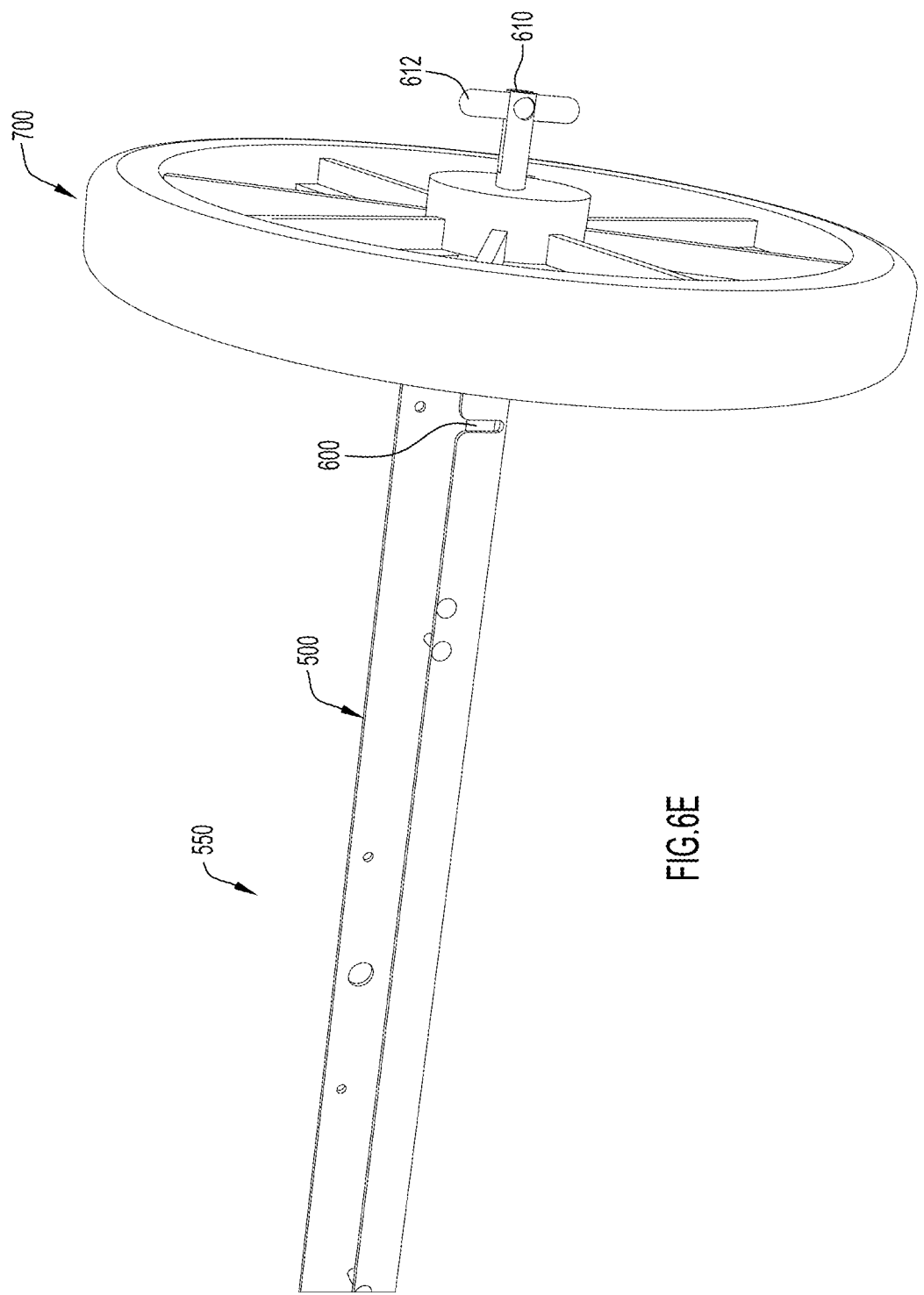

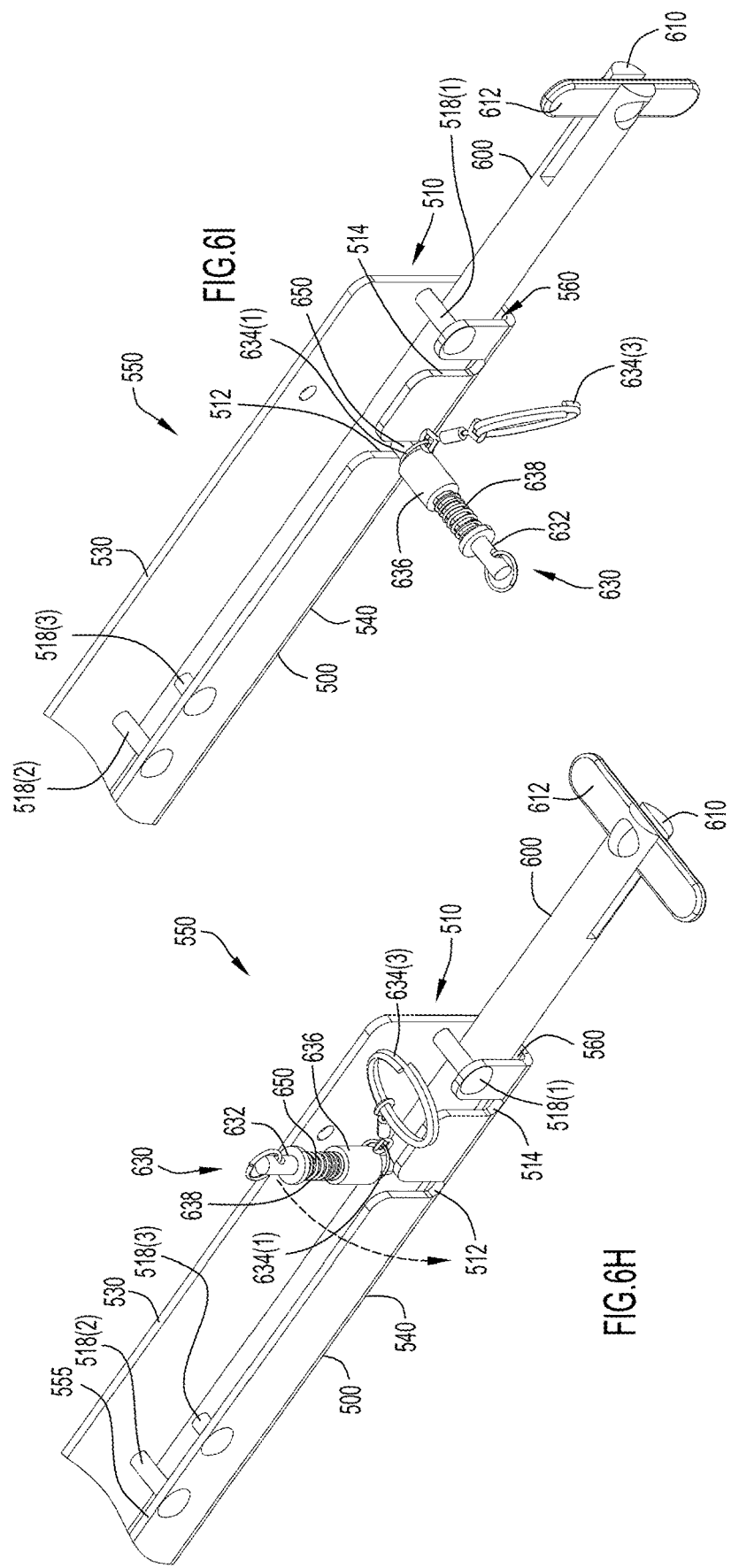

COLLAPSIBLE SUPPORT STRUCTURE

CROSS-REFERENCE TO RELATED APPLICATION

This application claims priority from U.S. Provisional Patent Application Ser. No. 63/299,125, filed Jan. 13, 2022, and entitled "Collapsible Support Structure," the entire disclosure of which is incorporated herein by reference.

TECHNICAL FIELD

Embodiments of the invention are directed toward a collapsible support structure.

BACKGROUND

Conventional collapsible support structures are able to be folded between a deployed configuration, in which the collapsible support structure is able to support an object above a support surface, and a storage or stowed configuration, in which the frame of the collapsible support structure is folded to lay substantially flat. In addition, some conventional collapsible support structures are equipped with wheels to enable the conventional collapsible support structures to travel over a support surface (i.e., the ground, a floor, etc.). However, when these conventional collapsible support structures are equipped with wheels, the wheels typically are not removable. This often defeats the purpose of reconfiguring the collapsible support structures to the storage or stowed configuration because the wheels make the conventional collapsible support structures bulky. The bulkiness of the conventional collapsible support structures makes it difficult to transport the conventional collapsible support structures to a destination. Other conventional collapsible support structures may be equipped with wheels that are removable, but the wheels are typically difficult to remove and reassemble on the conventional collapsible support structures. Furthermore, when the conventional collapsible support structures are equipped with removable wheels, the wheels are often unable to efficiently roll across a support surface (e.g., the wheels are more susceptible to wobbling).

It would thus be desirable to provide a collapsible support structure with a wheel and axle assembly that promotes ease of removability of the wheels from the collapsible support structure, while still enabling the wheels to roll/rotate efficiently when disposed on the collapsible support structure. It would further be desirable to provide a collapsible support structure with a deployable axle as part of the axle assembly, where the axle remains in the deployed configuration when in use (i.e., a wheel is attached to the axle assembly) but can be in a stowed configuration when the cart is not in use.

SUMMARY

Presented herein is a new and improved collapsible support structure. The collapsible support structure includes a plurality of support portions and is reconfigurable between a deployed configuration, in which the collapsible support structure can support items and facilitate transportation of items over a support surface, and a folded configuration, in which the components of the collapsible support structure lie in substantially the same plane or in closely proximate planes with one another (i.e., substantially flat and compact, compact geometry, etc.). Coupled to one of the support portions may be an axle assembly that enables a set of wheels, set of assemblies each having multiple wheels; a set of assemblies, each including a ski; a set of assemblies, each including a subassembly that has tracks or treads; or other types of assemblies to be easily attached to the collapsible support structure to facilitate more effortless movement of the collapsible support structure across a support surface. The axle assembly further enables wheels to be easily removed when the wheels or other assemblies that are no longer in use or desired by the user of the collapsible support structure. The axle assembly may be equipped with an axle housing and at least one axle repositionable along the axle housing between a storage position and a deployed position. The axle may contain a retaining unit that secures the axle in the deployed position along the axle housing.

The collapsible support structure may be further integrated or independently embodied as, but not limited to, a utility cart, a chair, a chaise lounge, a garden cart, a bicycle utility cart, and/or a bicycle passenger cart.

BRIEF DESCRIPTION OF THE DRAWINGS

The collapsible support structure and axle assembly presented herein may be better understood with reference to the following drawings and description. It should be understood that some elements in the figures may not necessarily be to scale and that emphasis has been placed upon illustrating the principles disclosed herein.

FIG. 1D illustrates a rear perspective view of an end of the axle assembly of the collapsible support structure shown in FIG. 1A.

FIG. 4A illustrates a side view of an end of the axle shown in FIG. 3, in which a rotatable tab of the axle is positioned in the aligned/stowed position.

FIG. 4B illustrates a side view an end of the axle shown in FIG. 3, the rotatable tab of the axle being positioned in the transverse/deployed position.

FIG. 5A illustrates a side view of the retaining unit of the axle illustrated in FIG. 3, the spacer of the retaining unit being positioned in the unactuated position.

FIG. 5B illustrates a side view of the retaining unit illustrated in FIG. 5A, the spacer of the retaining unit being positioned in the actuated position.

FIG. 6A illustrates a perspective view of the axle assembly (i.e., axle housing and one of the axles) of the collapsible support structure shown in FIG. 1A, one end of the axle assembly shown in isolation with the axle in a stowed/storage position.

FIG. 6B illustrates a perspective view of the end of the axle assembly illustrated in FIG. 6A, the end of the axle assembly shown in isolation with the axle in the process of being deployed (i.e., the retaining unit being in a position enabling axle sliding from the from the stowed/storage position to a deployed position) and the rotatable tab of the axle being positioned in the aligned/stowed position.

FIG. 6E illustrates a perspective view of the end of the axle assembly illustrated in FIG. 6A, the end of the axle assembly shown in isolation with the axle deployed with a wheel coupled to the axle.

FIG. 6H illustrates a perspective view of the end of the axle assembly illustrated in FIG. 6A, the end of the axle assembly shown in isolation with the axle in the process of being deployed and aligned horizontally along the axle housing with the innermost slot of the axle housing, and the rotatable tab of the axle being positioned in the transverse/deployed position.

FIG. 6I illustrates a perspective view of the end of the axle assembly illustrated in FIG. 6H, the end of the axle assembly shown in isolation with the retaining unit in an actuated position and the axle deployed (without a wheel coupled to the axle).

DETAILED DESCRIPTION

Figure 1A:
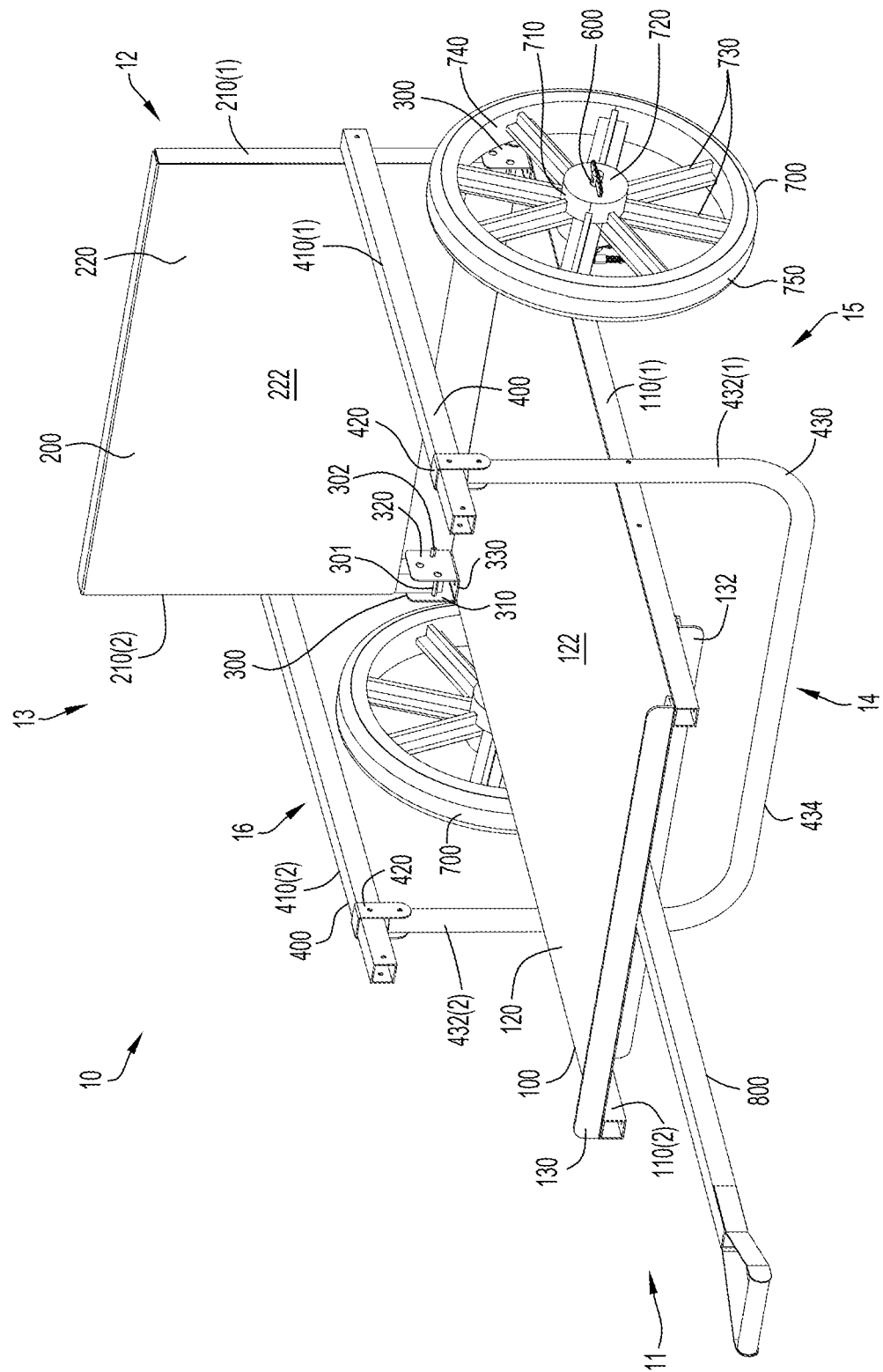
FIG. 1A illustrates a front perspective view of a collapsible support structure in accordance with an embodiment of the invention, the collapsible support structure shown in its deployed configuration.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Presented herein is a new and improved collapsible support structure. The collapsible support structure includes a plurality of support portions and is reconfigurable between a deployed configuration, in which the collapsible support structure can support items and facilitate transportation of items over a support surface, and a folded configuration, in which the components of the collapsible support structure lie in substantially the same plane or in closely proximate planes with one another (i.e., substantially flat and compact, compact geometry, etc.). Coupled to one of the support portions may be an axle assembly that enables a set of wheels to be easily attached to the collapsible support structure to facilitate more effortless movement of the collapsible support structure across a support surface. The axle assembly further enables wheels to be easily removed when the wheels are no longer in use or desired by the user of the collapsible support structure. The axle assembly may be equipped with an axle housing and at least one axle repositionable along the axle housing between a storage position and a deployed position. The axle may contain a retaining unit that secures the axle in the deployed position along the axle housing.

While the embodiments of the collapsible support structure illustrated in FIGS. 1A-1F, 2, 3, 4A, 4B, 5A-5C, 6A-6J, 7, and 8A-8F are depicted as a foldable cart with a set of wheels, the collapsible support structure may take any form that utilizes some or all of the features described herein. For example, other embodiments of the collapsible support structure may include, but are not limited to, a foldable chair, a wheel chair, a garden cart, a utility cart, a bicycle trailer, a pet trailer, a stroller, a wheelbarrow, a beach chair, a chaise lounge, a wagon, etc.

Figure 1B:
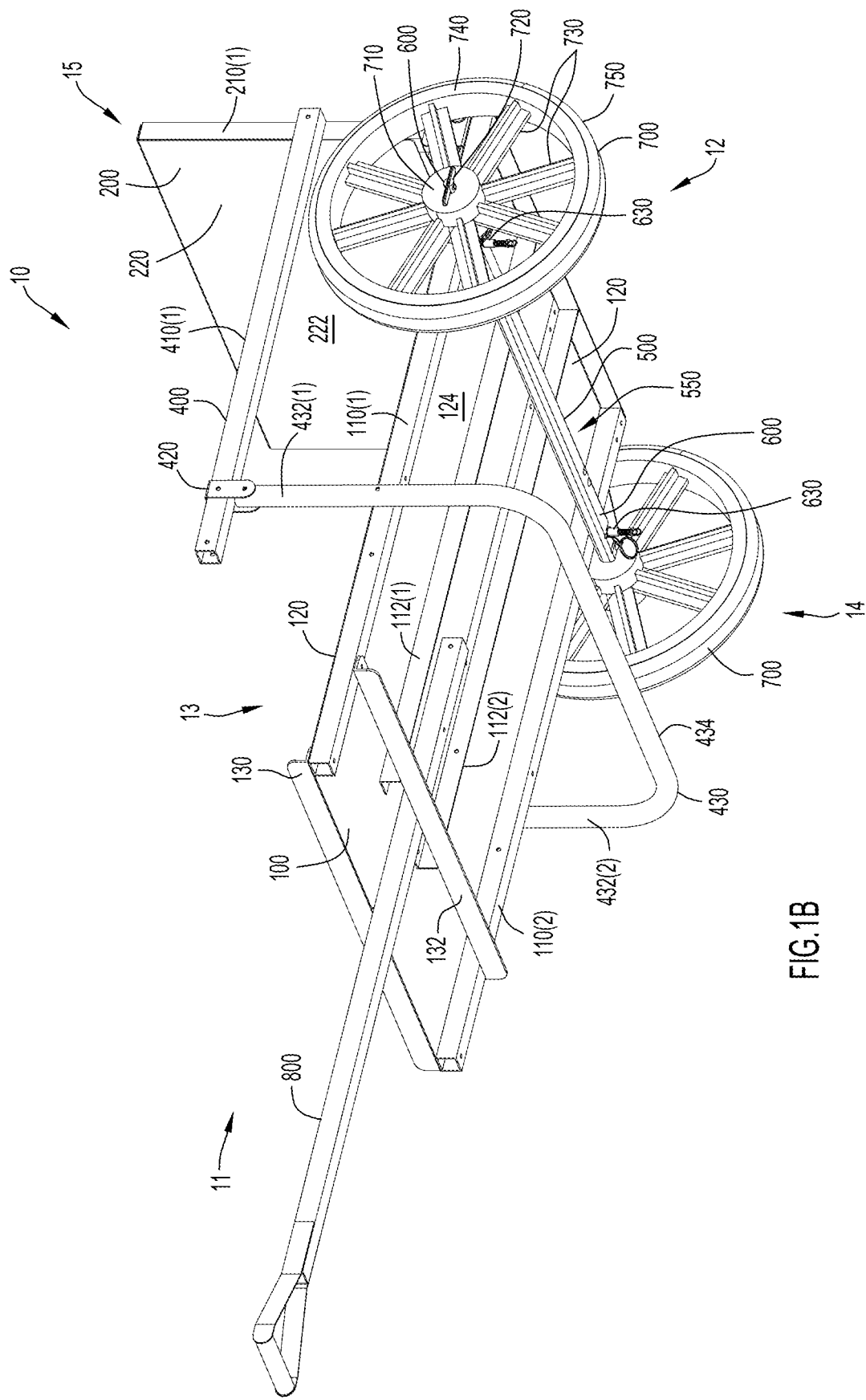
FIG. 1B illustrates a bottom perspective view of the collapsible support structure shown in FIG. 1A.
Figure 1C:
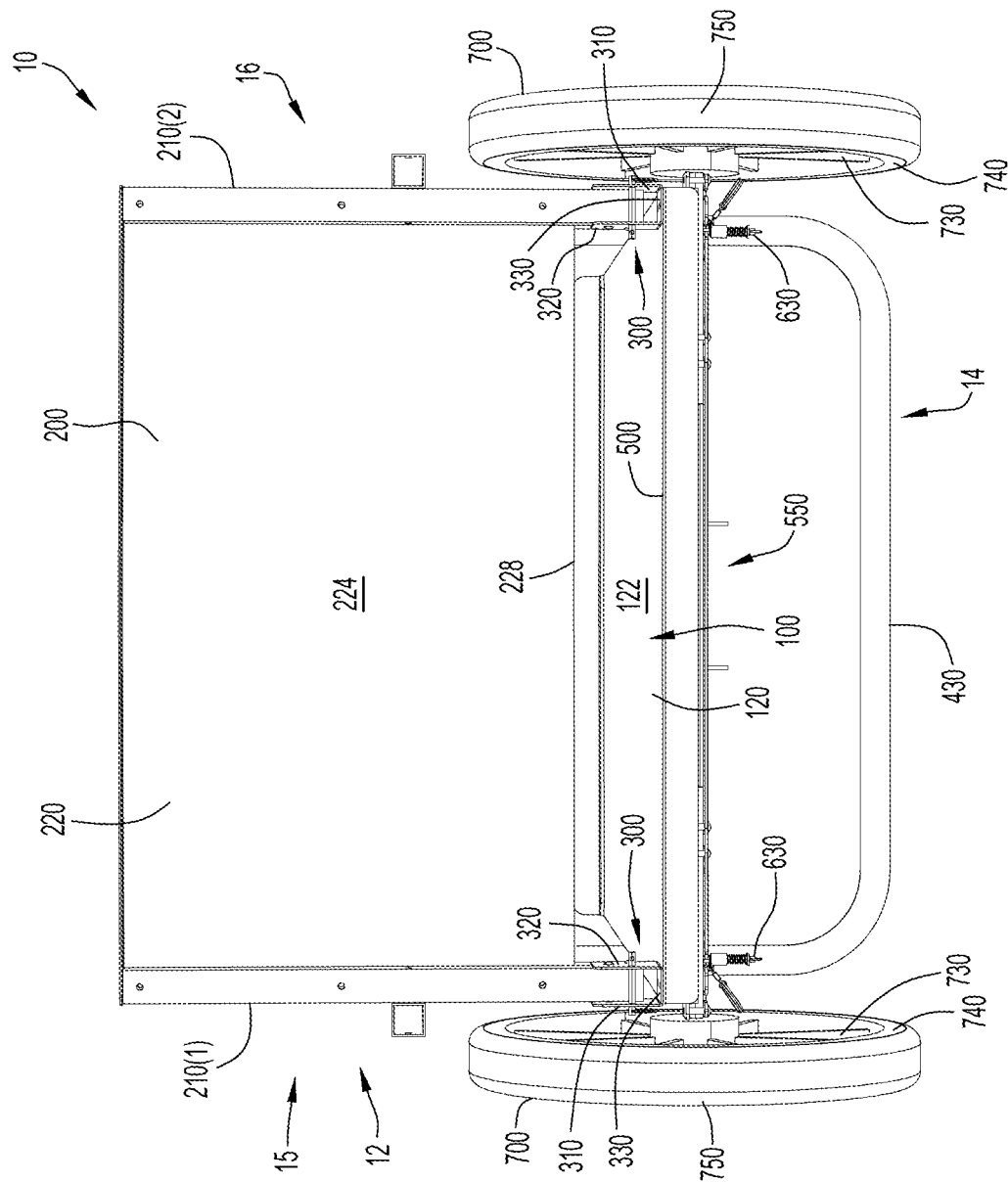
FIG. 1C illustrates a rear view of the collapsible support structure shown in FIG. 1A.

Referring to FIGS. 1A-1D, in an embodiment, the collapsible support structure 10 includes a front end 11, a rear end 12 opposite the front end 11, a top side 13 spanning between the front end 11 and the rear end 12, a bottom side 14 opposite the top side 13, a first side 15 spanning between the front end 11 and the rear end 12, and a second side 16 opposite the first side 15. As further illustrated, the collapsible support structure 10 contains a horizontal support portion 100, a vertical support portion 200, and a pair of U-brackets 300 coupling the horizontal support portion 100 to the vertical support portion 200 proximate to the rear end 12 of the collapsible support structure 10. The collapsible support structure 10 also includes a pair of side rails 400 that are pivotally coupled to the horizontal support portion 100 and the vertical support portion 200 on the first and second sides 15, 16 of the collapsible support structure 10. FIGS. 1C and 1D further illustrate that the collapsible support structure 10 further includes an axle assembly 550 coupled to the horizontal support portion 100 proximate to the bottom side 14 and the rear end 12 of the collapsible support structure 10, where the axle assembly 550 includes at least an axle housing 500, a pair of axles 600, and a pair of wheels 700. As further illustrated in FIGS. 1A and 1B, the collapsible support structure 10 may also include a repositionable handle 800 coupled to the horizontal support portion 100 proximate to the bottom side 14 and the front end 11 of the collapsible support structure 10.

Continuing with FIGS. 1A-1D, the horizontal support portion 100 is a substantially planar and rectangular structure. In other embodiments, however, the horizontal support portion 100 may be of any other shape. As best illustrated in FIG. 1B, the horizontal support portion 100 includes a pair of longitudinal side frame members 110(1), 110(2) that span from the front end 11 to the rear end 12 of the collapsible support structure 10 along the first and second sides 15, 16 of the collapsible support structure 10. The horizontal support portion 100 further includes a substantially rigid planar surface structure 120 that contains a top surface 122 (best shown in FIG. 1A) and an opposite bottom surface 124 (best shown in FIG. 1B). The longitudinal side frame members 110(1), 110(2) are coupled to the bottom surface 124 of the surface structure 120 such that the longitudinal side frame members 110(1), 110(2) are spaced from one another, where, as previously explained, the first longitudinal side frame member 110(1) is disposed along the first side 15 of the collapsible support structure 10, and the second longitudinal side frame member 110(2) is disposed along the second side 16 of the collapsible support structure 10. In some embodiments, longitudinal side frame members 110(1), 110(2) are integrated into the horizontal support portion 100 rather than being coupled to horizontal support portion 100 so that horizontal support portion 100 and longitudinal side frame members 110(1), 110(2) form one contiguous and uniform unit.

As best shown in FIG. 1B, the horizontal support portion 100 also includes a pair of interior longitudinal frame members 112(1), 112(2), where the frame members 112(1), 112(2) extend along the bottom surface 124 of the surface structure 120 in a direction that is parallel to the first and second longitudinal side frame members 110(1), 110(2). Moreover, the interior longitudinal frame members 112(1), 112(2) are disposed between the longitudinal side frame members 110(1), 110(2) such that the interior longitudinal frame members are spaced from one another and from the first and second longitudinal frame members 110(1), 110(2).

As best shown in FIGS. 1A-1B, the horizontal support portion 100 also includes a first cross brace 130 that extends across the top surface 122 of the surface structure 120 of the horizontal support portion 100 and a second cross brace 132 that extends across the bottom surface 124 of the surface structure 120 of the horizontal support portion 100. Both the first cross brace 130 and the second cross brace 132 extend between the longitudinal side frame members 110(1), 110(2) (i.e., the first and second cross braces 130, 132 are coupled to the first longitudinal side frame member 110(1) and the second longitudinal side frame member 110(2)). The second cross brace 132 is further positioned below the handle 800 which may be reconfigurable to either extend from the front side 11 of the collapsible support structure 10 or be disposed completely under the horizontal support portion 100 of the collapsible support structure 10. When the handle 800 is fully extended from the structure 10, it perpendicularly intersects the vertical planes of the cross braces 130, 132. The first cross brace 130 is coupled directly to the longitudinal side frame members 110(1), 110(2) such that the first cross brace 130 extends across the top surface 122 of the surface structure 120 of the horizontal support portion 100. Conversely, the second cross brace 132 is coupled directly to the longitudinal side frame members 110(1), 110(2) such that the second cross brace 132 is sufficiently spaced from the bottom surface 124 of the surface structure 120 to permit the handle 800 to be positioned between the cross braces 130, 132 and the bottom surface 124 of the support structure 120 of the horizontal support portion 100. In addition, the cross braces 130, 132 are of a configuration that enables the cross braces 130, 132 to provide torsional rigidity to the horizontal support portion 100 and to absorb stress otherwise imparted to the surface structure 120 by the handle 800 when the cart is fully deployed and the handle is used to lift the front of the cart up to pull it over a surface.

Figure 1E:
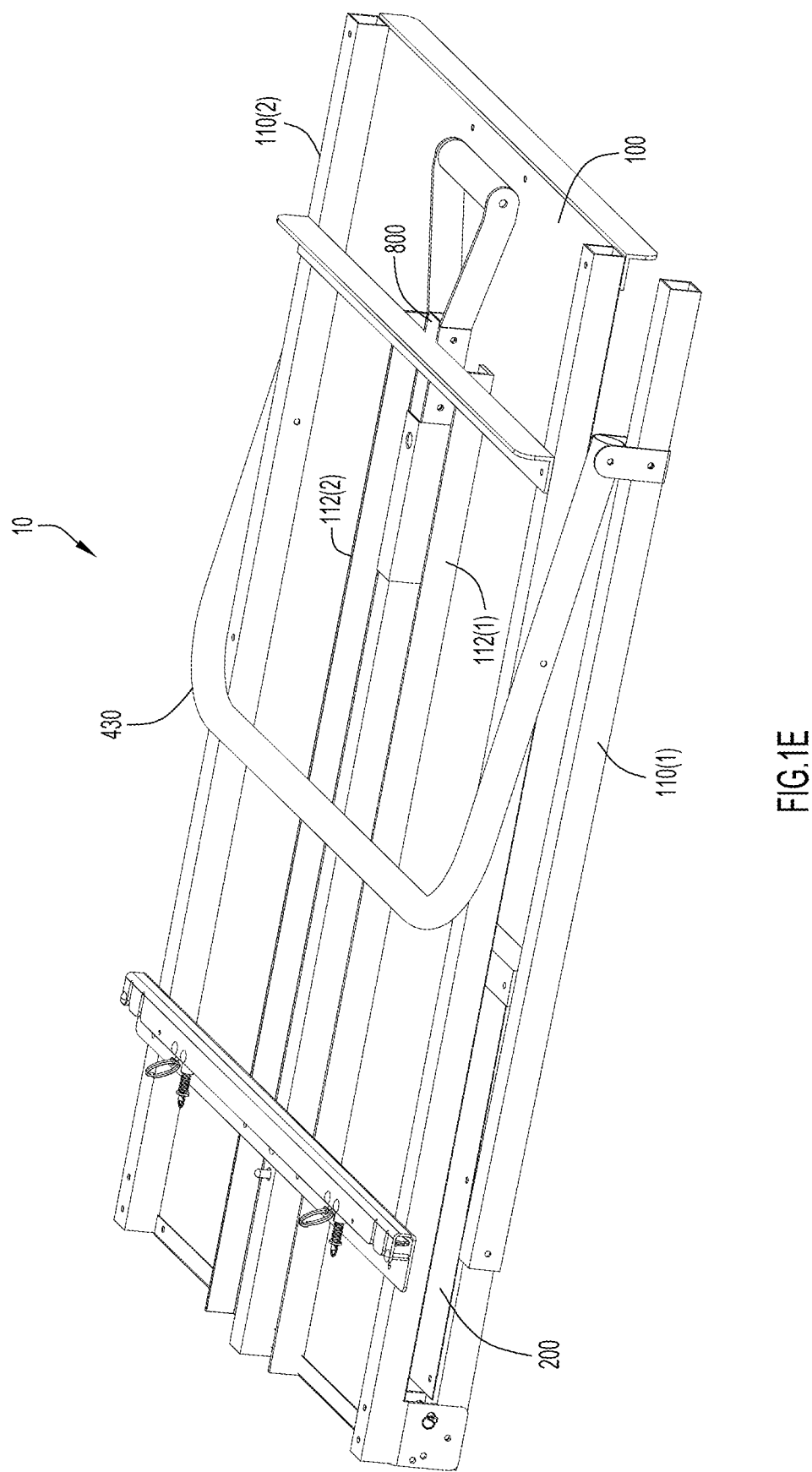
FIG. 1E illustrates a bottom perspective view of a collapsible support structure in accordance with an embodiment of the invention, the collapsible support structure shown in its folded configuration.
Figure 1F:
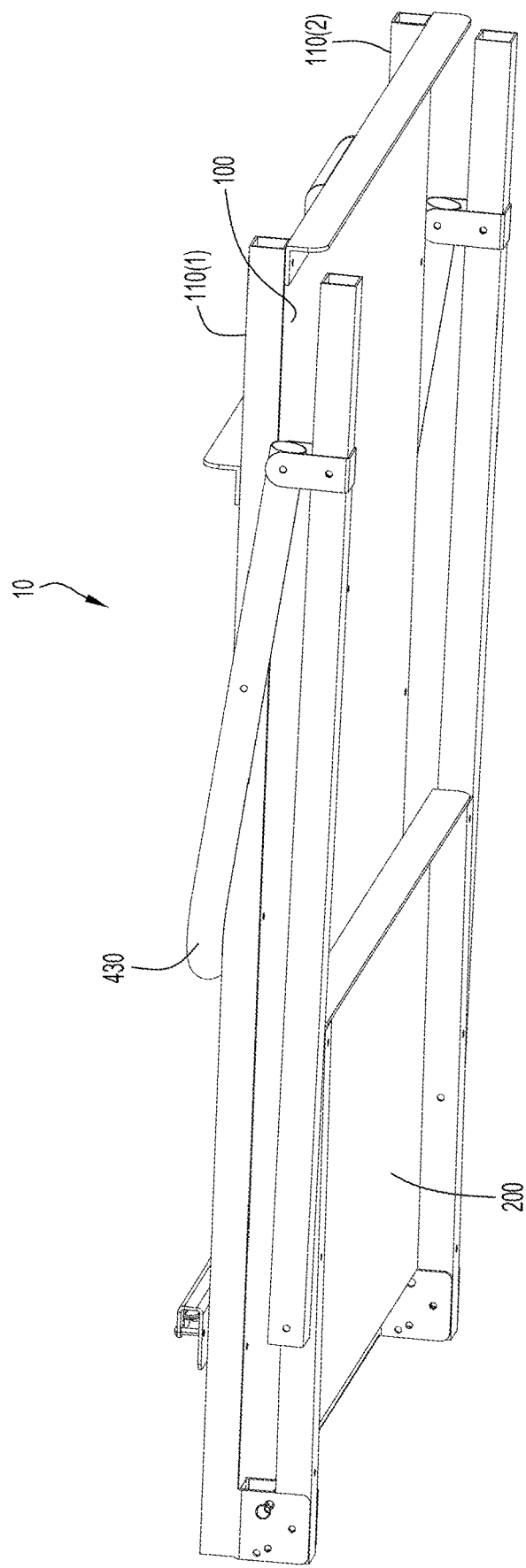
FIG. 1F illustrates a side perspective view of a collapsible support structure in accordance with an embodiment of the invention, the collapsible support structure shown in its folded configuration.

The axle housing 500 also provides torsional rigidity to the horizontal support portion 100. While the axle housing 500 is explained in more detail below with regard to FIGS. 2, 3, 4A, 4B, 5A-5C, 6A-6J, 7, and 8A-8F, the axle housing 500 is coupled to the longitudinal side frame members 110(1), 110(2) in a similar manner as the second cross brace 132, where the axle housing 500 spans across, but is spaced from, the bottom surface 124 of the horizontal support portion 100. Moreover, as best illustrated in FIGS. 1C and 1D, the axle housing 500 is coupled to the longitudinal side frame members 110(1), 110(2) more proximate to the rear end 12 of the collapsible support structure 10 than the front end 11 of the collapsible support structure 10. Ideally, the axle housing 500 is coupled to the longitudinal side frame members 110(1), 110(2) at a distance from front end 11 that is sufficient for the U-shaped leg member 430 to lay against longitudinal side frame members 110(1), 110(2) when the collapsible support structure 10 is configured to the folded configuration (FIGS. 1E and 1F).

With continued reference to FIGS. 1A-1C, the vertical support portion 200, like the horizontal support portion 100, is a substantially planar and rectangular structure. In other embodiments, however, the vertical support portion 200 may be of any other shape. As best illustrated in FIG. 1C, the vertical support portion 200 includes a pair of vertical side frame members 210(1), 210(2) that span generally along the first side and second sides 15, 16 of the collapsible support structure 10, respectively (i.e., such that the vertical side frame members 210(1), 210(2) are spaced from one another). The vertical support portion 200 further includes a substantially rigid planar surface structure 220 that contains a front surface 222 (best shown in FIG. 1A) and an opposite rear surface 224 (best shown in FIG. 1C). The vertical side frame members 210(1), 210(2) are coupled to the rear surface 224 of the surface structure 220 of the vertical support portion 200 such that the lower ends of the vertical side frame members 210(1), 210(2) extend beyond the lower edge of the vertical support portion 200.

Continuing with FIGS. 1A-1D, a pair of U-brackets 300 pivotally couple the vertical support portion 200 to the horizontal support portion 100 proximate to the rear end 12 of the collapsible support structure 10. The U-brackets 300 may be substantially U-shaped with an outer portion 310 disposed in a generally vertical position, an inner portion 320 opposite the outer portion 310 and also disposed in a generally vertical position, and a lower portion 330 coupled to the lower ends of the outer and inner portions 310, 320. The lower portion 330 may be disposed on the top surface 122 of the surface structure 120 of the horizontal support portion 100 proximate to the rear end 12 of the collapsible support structure 10. The outer and inner portions 310, 320 of each U-bracket 300 are spaced from one another a distance that is large enough to receive the ends of the vertical side frame members 210(1), 210(2) of the vertical support portion 200. The ends of the vertical side frame members 210(1), 210(2) may be coupled to the U-bracket 300 such that the vertical side frame members 210(1), 210(2), and consequently the vertical support portion 200, rotate about an axis passing through the U-brackets 300. Rivets 301 are fastened in front of the bottoms of vertical side frame members 210(1), 210(2) to prevent their portions above the attachment points with U-bracket 300 from rotating in a direction that is opposite of front 11. The U-brackets 300 may also be equipped with fasteners, rivets, protrusions, etc. that are configured to prevent the vertical support portion 200 from rotating past a substantially vertical position (i.e., the position shown in FIGS. 1A-1D) when the vertical support portion 200 is rotated about the axis extending through the U-brackets 300. The U-brackets 300 may be further equipped with a mechanism for securing the vertical support portion 200 in the upright position. In one example, the mechanism may be removable pins 302 that are inserted through the outer and inner portions 310, 320 of each of the U-brackets 300 to prevent rotation of the vertical support portion 200. With the pins removed, the vertical support portion 200 may be capable of rotating about the axis extending through the U-brackets 300 to a folded position (FIGS. 1E and 1F), where the front surface 222 of the vertical support portion 200 is folded toward the top surface 122 of the horizontal support portion 100.

As previously stated, and as illustrated in FIGS. 1A and 1B, the collapsible support structure 10 further includes a pair of side rails 400 that are pivotally coupled to the horizontal support portion 100 and the vertical support portion 200 on the first and second sides 15, 16 of the collapsible support structure 10. The side rails 400 comprise of two horizontal elongate members 410(1), 410(2). Ends of the horizontal elongate members 410(1), 410(2) are pivotally coupled to the vertical side frame members 210(1), 210(2) of the vertical support portion 200. As further illustrated in FIGS. 1A and 1B, the side rails 400 may further include a U-shaped leg member 430 that is pivotally coupled to the elongated members 410(1), 410(2) (e.g., via brackets 420), and pivotally coupled to the longitudinal side frame members 110(1), 110(2) of the horizontal support portion 100. The U-shaped leg member 430 may include two opposing vertical sections 432(1), 432(2) spaced from one another, and a horizontal section 434 coupled to the two vertical sections 432(1), 432(2). The vertical sections 432(1), 432(2) may be pivotally coupled to the bracket 420 coupled to the horizontal elongate members 410(1), 410(2), and pivotally coupled to the longitudinal side frame members 110(1), 110(2) of the horizontal support portion 100. The horizontal section 434 is configured to engage a support surface to support the front end 11 of the collapsible support structure 10 above the support surface.

Moreover, with the horizontal elongate members 410(1), 410(2) being pivotally coupled to the vertical side frame members 210(1), 210(2) of the vertical support portion 200, and the U-shaped leg member 430 being pivotally coupled to both the brackets 420 of the elongate members 410(1), 410(2) and the longitudinal side frame members 110(1), 110(2) of the horizontal support portion 100, as the vertical support portion 200 is rotated toward the horizontal support portion 100 (i.e., to the folded position (FIGS. 1E and 1F)), the horizontal elongate members 410(1), 410(2) translate toward the horizontal support portion 100 and the horizontal section 434 of the U-shaped leg member 430 rotates toward the bottom surface 124 of the horizontal support portion 100.

Turning to FIGS. 1C, 1D, 2, 3, 4A, 4B, and 5A-5C, as previously explained, the collapsible support structure 10 may be equipped with an axle assembly 550, which includes an axle housing 500, a pair of axles 600, a pair of retaining units 630, and a pair of wheels 700 (best shown in FIGS. 1A-1D). In an alternative embodiment, the axle assembly may include a pair of snap buttons 570 (shown in FIGS. 7 and 8A-8F). While FIGS. 1D, 2, 3, 4A, 4B, 6A-6J, and 8A-8F only illustrate one end of the axle assembly 550, both ends of the axle assembly 550 are identical, but mirror images to one another. Thus, the description set forth herein with regard to one end of the axle assembly 550 and the components disposed at that end of the axle assembly 550 also applies to the other end of the axle assembly 550 and the components disposed on that respective end of the axle assembly 550.

Figure 2:
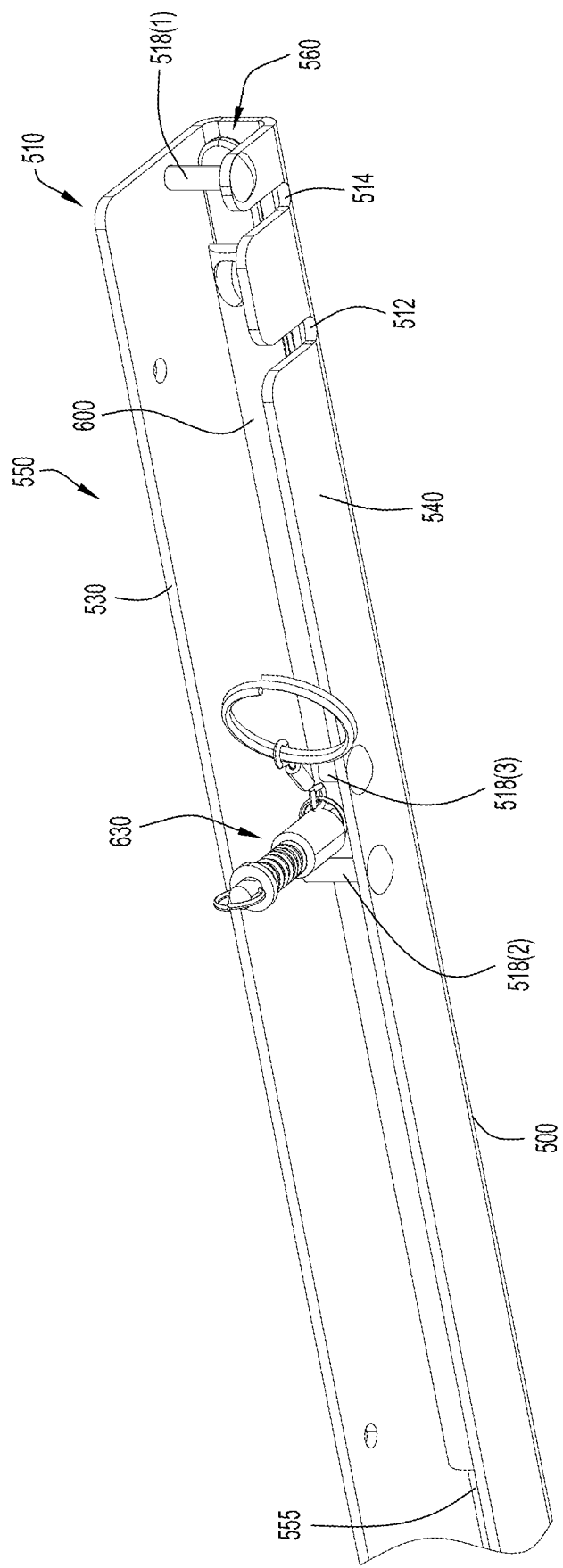
FIG. 2 illustrates an isolated perspective view of one end of the axle assembly of the collapsible support structure shown in FIG. 1A.

As best illustrated in FIGS. 1D and 2, the axle housing 500 is substantially elongated with a first end (or distal end) 510, and an opposite second end (or proximal end) (not shown). As best illustrated in FIG. 2, the axle housing 500 includes a top side or top planar portion 530, an opposite bottom side or bottom planar portion 540, and an intermediate side or intermediate planar portion 555 that extends between the top and bottom sides 530, 540. The three sides 530, 540, 555 collectively form a channel 560 with an open side that faces in the rearward direction of the collapsible support structure 10 (as best illustrated in FIGS. 1C, 1D, and 2). Thus, the channel 560 may be partially enclosed. In other embodiments, the open side may face in a forward direction. Thus, a cross-section of the axle housing 500 is substantially U-shaped. As previously described herein, the axle housing 500 is coupled to the horizontal support portion 100 proximate to the rear end 12 of the collapsible support structure 10.

As further illustrated in FIG. 2, each end of the axle housing 500 may include at least one slot and three pillars 518(1), 518(2), 518(3) (e.g., rivets or other fasteners extending between the top and bottom sides 530, 540 of the axle housing 550). In an example embodiment, an innermost slot 512 is disposed within the bottom side 540 of the axle housing 500 proximate to the end of the axle housing 500. A second or outermost slot 514 may be disposed within the bottom side 540 of the axle housing 500 proximate to the innermost slot 512, but closer to the respective end of the axle housing 500 in relation to the innermost slot 512. As further illustrated, the first pillar 518(1) may be disposed proximate to the first end 510 and the outermost slot 514 such that the first pillar 518(1) extends between the top side 530 and the bottom side 540, but is spaced from the intermediate side 555. The second pillar 518(2) may be spaced from the end 510 of the axle housing 500 and from the outermost and innermost slots 514, 512. The second pillar 518(2) may extend between the top side 530 and the bottom side 540, but is spaced from the intermediate side 555. The third pillar 518(3) may be spaced from the end 510 of the axle housing 500 and from the outermost and innermost slots 514, 512. The third pillar 518(3) is disposed proximate the second pillar 518(2), but closer to the end 510 of the axle housing 500. The third pillar 518(3) may extend from bottom side 540 toward top side 530 for a length less than the extension of the first and second pillars 518(1), 518(2) (or less than the distance between the top and bottom sides 530, 540) to provide a gap to enable a retaining unit 630 to slide past the third pillar 518(3) as described below. The third pillar 518(3) is spaced from the intermediate side 555 for a sufficient distance to prevent passage of the retaining unit when in an unactuated position. The pillars 518(1), 518(2), and/or 518(3) serve to retain one of the axles 600 within the channel 560 proximate to the respective end, while still enabling the axle 600 to slide through a portion of the channel 560.

Figure 3:
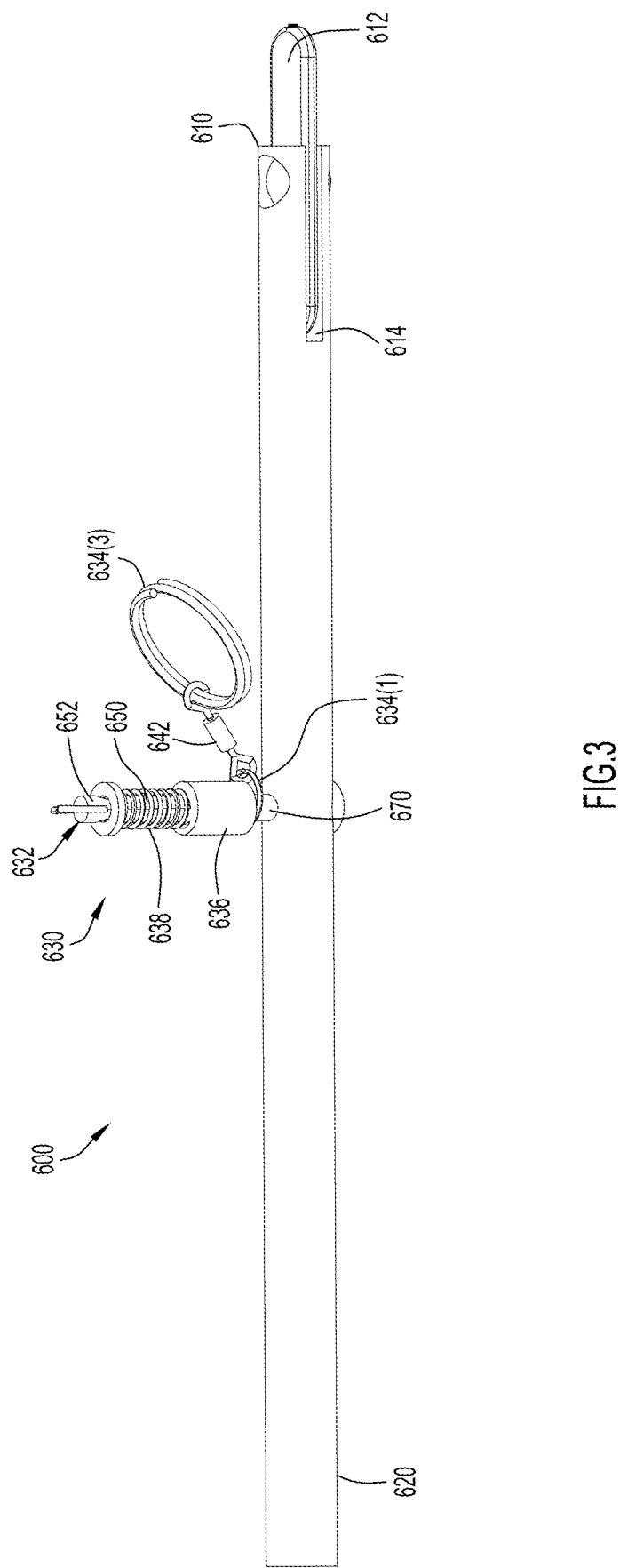
FIG. 3 illustrates a perspective view of an axle of the collapsible support structure shown in FIG. 1A.

Turning to FIG. 3, an isolated view of one of the axles 600 is illustrated. While only a single axle 600 is illustrated in FIG. 3, the description of the embodiment of FIG. 3 applies to both axles 600 as they are identical to one another. The axle 600 has a substantially cylindrical elongated shape with a first end 610 and an opposite second end 620. The first end 610 may include a rotatable tab 612 disposed, at least partially, within a linear slot 614 (i.e., the rotatable tab 612 is rotatably coupled to the first end 610 of the axle 600). The rotatable tab 612 is configured to rotate about an axis that extends through the first end 610 of the axle 600 and is transverse to an axis extending through the length of the axle 600. As shown in FIGS. 4A and 4B, the rotatable tab 612 is configured to rotate between an aligned/storage position (shown in FIG. 4A) and a transverse/deployed position (shown in FIG. 4B), where the rotatable tab 612 rotates about the axis to be repositioned between the two positions. When the rotatable tab 612 is in the aligned position, the rotatable 612 tab is collinear with the axle 600, or is aligned with the axle 600 such that the rotatable tab 612 extends in the same direction as, or at least partially along, the axle 600 (i.e., the rotatable tab 612 extends along an axis that extends through the length of the axle 600 such that the rotatable tab 612 is substantially coaxial with the axle 600). Thus, when the rotatable tab 612 is in the aligned position, a larger portion of the rotatable tab 612 is disposed within the slot 614 than when the rotatable tab 612 is in the transverse position. When the rotatable tab 612 is in the transverse/deployed position, the rotatable tab 612 is oriented transverse to the length of the axle 600 (i.e., the rotatable tab 612 extends across the end 610 of the axle 600 such that the rotatable tab 612 extends across, or is transverse to, the axis that extends through the length of the axle 600).

Figure 5C:
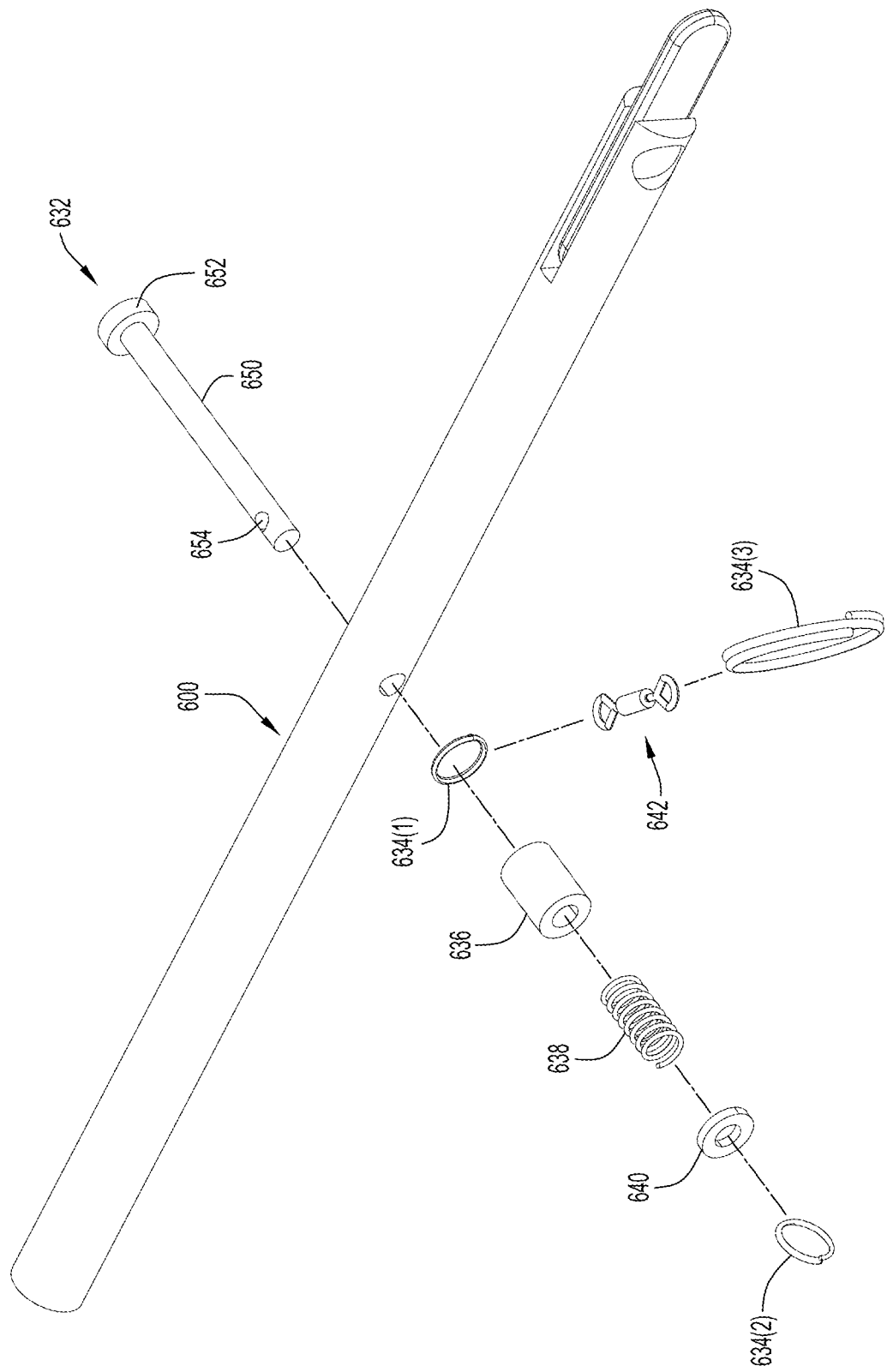
FIG. 5C illustrates an exploded view of the retaining unit illustrated in FIG. 5A with respect to the axle illustrated in FIG. 3.

As further illustrated in FIG. 3, a retaining unit 630 is coupled to, and extends from, the axle 600 at a location between the first end 610 and the second end 620. The retaining unit 630 may be sized and shaped to fit within the slots 512, 514 of the axle housing 500. As best illustrated in FIGS. 5A-5C, the retaining unit 630 may include a clevis pin 632, three split rings 634(1), 634(2), 634(3), a spacer 636, a resilient member 638 (e.g., spring), a washer 640, and a barrel swivel 642. As best illustrated in FIG. 5C, the clevis pin 632 includes an elongated shaft 650 having a first end and an opposite second end. A head 652 may be disposed on the first end of the shaft 650 of the clevis pin 632, where the head 652 has a wider diameter than that of the shaft 650 of the clevis pin 632. The shaft 650 of the clevis pin 632 may further contain an aperture 654 disposed proximate to the second end of the clevis pin 632. As further illustrated, disposed along the shaft 650 of the clevis pin 632 is a first split ring 634(1), a spacer 636, a resilient member 638, and a washer 640. The shaft 650 of the clevis pin 632 may be inserted through each of the first split ring 634(1), the spacer 636, the resilient member 638, and the washer 640. A second split ring 634(2) may be threaded through the aperture 654 of the shaft 650 of the clevis pin 632, and may serve to retain the first split ring 634(1), the spacer 636, the resilient member 638, and the washer 640 on the shaft 650 between the second end of the shaft 650 and the head 652 of the clevis pin 632. As further illustrated in FIGS. 5A and 5B, one end of the barrel swivel 642 may be coupled to the first split ring 634(1), while a second end of the barrel swivel 642 may be coupled to the third split ring 634(3). The third split ring 634(3) may be larger in size than the first and second split rings 634(1), 634(2).

Returning to FIG. 3, the retaining unit 630 may be coupled to the axle 600 such that the shaft 650 of the clevis pin 632 of the retaining unit 630 is inserted through an opening 670 in the axle 600. Thus, the head 652 of the clevis pin 632 may be disposed on one side of the axle, while the rest of the shaft 650 of the clevis pin 632 and other components of the retaining unit 630 extend from the opposing side of the axle 600. As shown in FIGS. 3 and 5A, the resilient member 638 biases the spacer 636 and first split ring 634(1) (and subsequently the barrel swivel 642 and third split ring 634(3)) to an unactuated position, where the spacer 636 and first split ring 634(1) are disposed proximate to the head 652 of the clevis pin 632 and the axle 600. In other words, the resilient member 638 biases the spacer 636 and the first split ring 634(1) toward the head 652 of the clevis pin 632 and toward the axle 600. The spacer 636 and first split ring 634(1) may be repositioned to an actuated position, like that shown in FIG. 5B, when a user pulls the third split ring 634(3) away from the axle 600 and away from the head 652 of the clevis pin 632. Because the third split ring 634(3) is coupled to the first split ring 634(1) via the barrel swivel 642, pulling the third split ring 634(3) away from the axle 600 and away from the head 652 of the clevis pin 632 causes both the first split ring 634(1) and the spacer 636 to slide along the shaft 650 of the clevis pin 632 away from the head 652 of the clevis pin 632 and away from the axle 600. Sliding the spacer 636 and the first split ring 634(1) toward the second end of the shaft 650 of the clevis pin 632 compresses the resilient member 638 against the washer 640, which is compressed against the second split ring 634(2) threaded through the aperture 654. As described in further detail below, the spacer 636 being repositioned along the shaft 650 of the clevis pin 632 between the unactuated and actuated positions enables the retaining unit 630 to secure the axle 600 in the deployed position.

Returning to FIGS. 1A-1D, the wheels 700 are configured to be disposed on the axles 600 when the axles 600 are in the deployed position to support the rear end 12 of the collapsible support structure 10 above a support surface, while also enabling the collapsible support structure 10 to roll over a support surface when desired. Each wheel 700 may include a central hub 710 that contains a central opening 720 extending through the hub 710. Extending radially from the hub 710 around the periphery of the hub 710 is a series of spokes or pillars 730. Disposed around the radially extending spokes 730 is a circular rim 740, upon which a tire 750 may be affixed. In some embodiments, the wheel 700 may be a unitary structure that may only include a central hub 710 having a central opening 720, and may not contain any spokes 730 or a tire 750 affixed to a rim 740.

Figure 6C:
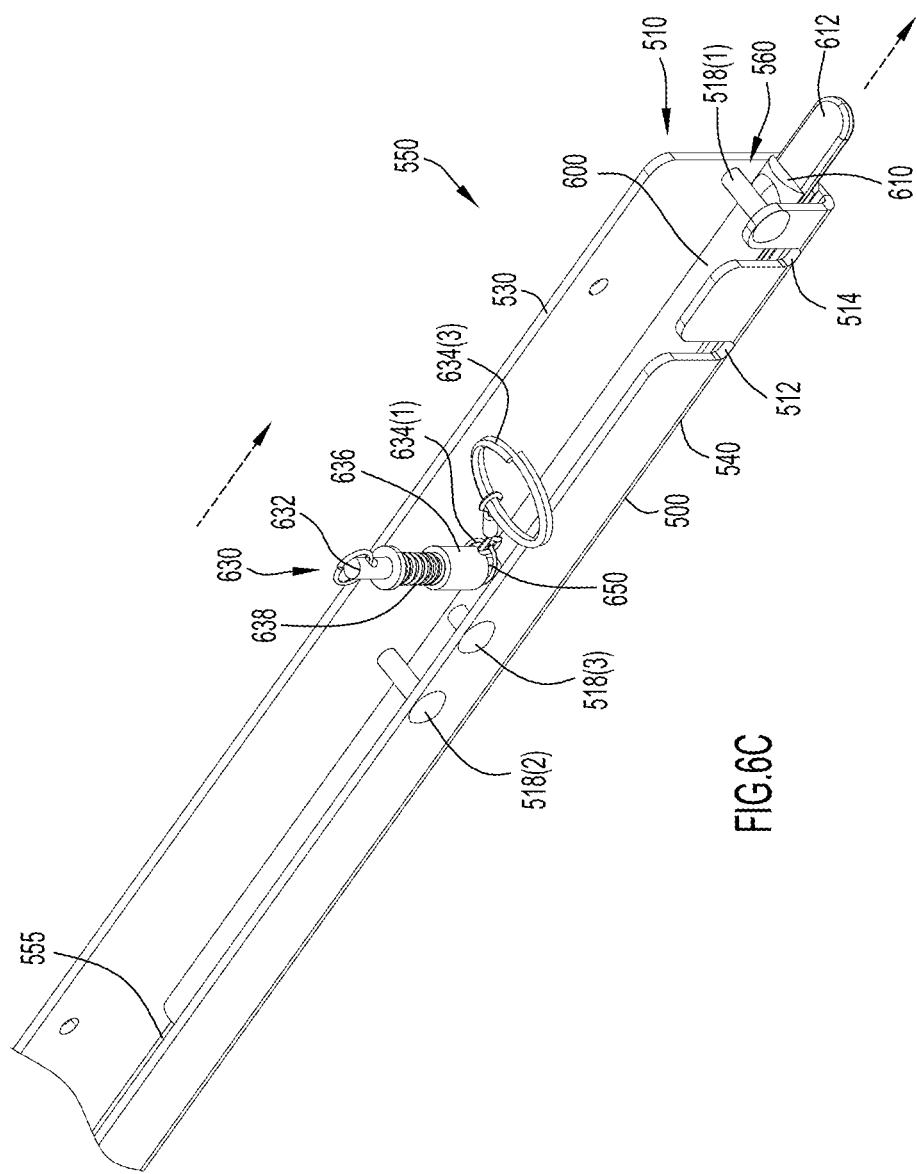
FIG. 6C illustrates a perspective view of the end of the axle assembly illustrated in FIG. 6A, the end of the axle assembly shown in isolation with the axle in the process of being deployed (i.e., the axle sliding from the from the stowed/storage position to a deployed position) and the rotatable tab of the axle being positioned in the aligned/stowed position.
Figure 6D:
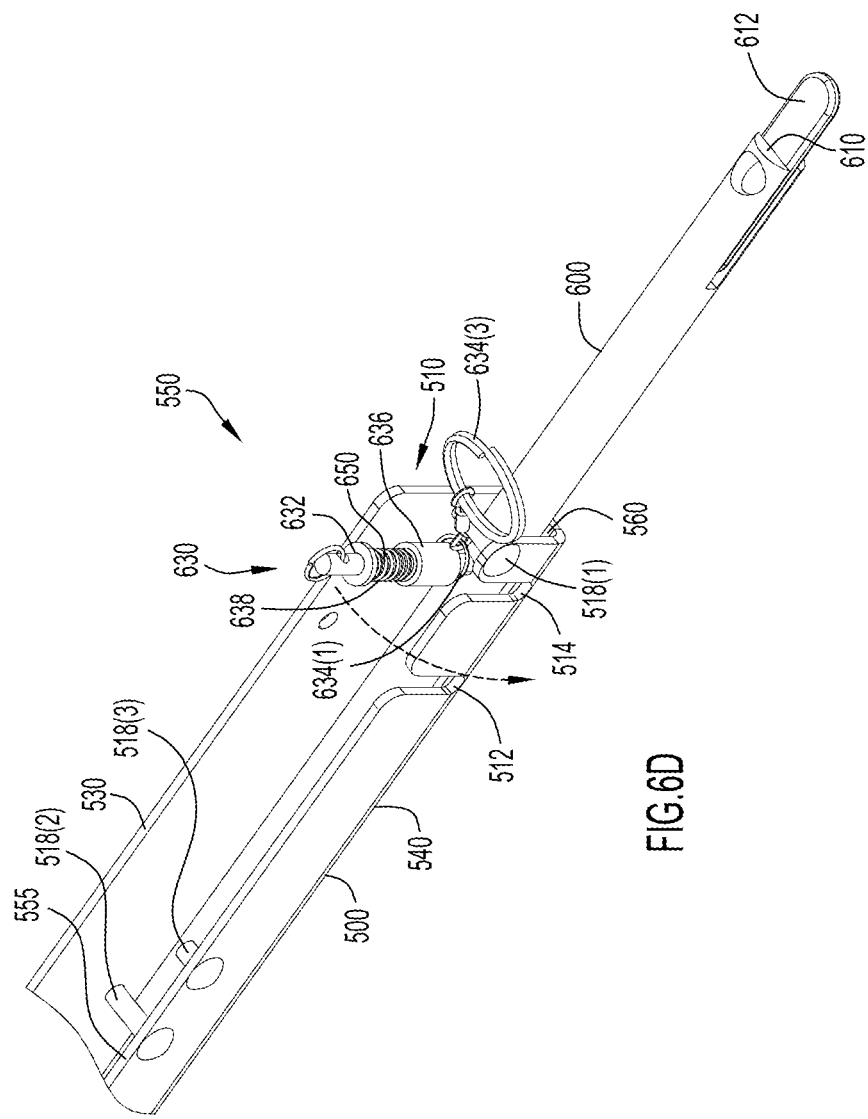
FIG. 6D illustrates a perspective view of the end of the axle assembly illustrated in FIG. 6A, the end of the axle assembly shown in isolation with the axle in the process of being deployed and aligned horizontally along the axle housing with the outermost slot of the axle housing, and the rotatable tab of the axle being positioned in the aligned/stowed position.

Turning to FIGS. 6A-6J, illustrated are isolated views of the first end 510 of the axle assembly 550 with the axle 600 slidably disposed within the channel 560 of the axle housing 500. FIGS. 6A-6J further illustrate the steps taken to deploy the axle 600. As illustrated in FIGS. 6A and 6B, the axle 600 is slidably disposed within the channel 560 of the axle housing 500 in a stowed or storage position. When the axle 600 is disposed in the storage position, the retaining unit 630 of the axle 600 may be disposed between the third pillar 518(3) protruding into the channel 560 of the axle housing 500 and the second pillar 518(2) of the axle housing 500. Thus, the third pillar 518(3) serves to prevent the axle 600 from sliding along the channel toward the axle deployed position. When the axle 600 is in the storage position, the end 610 of the axle 600 containing the rotatable tab 612 is disposed within the channel 560 of the axle housing 500. Moreover, the rotatable tab 612 is rotated to the aligned position, and is also disposed within the channel 560 of the axle housing 500. Thus, as illustrated, neither the first end 610 of the axle 600 nor the rotatable tab 612 may extend from the end 510 of the axle housing 500 when the axle 600 is in the storage position.

When a user wishes to deploy the axle 600 and secure a wheel 700 to the axle 600, the user may actuate the retaining unit 630 by pulling on the third split ring 634(3) of the retaining unit 630 to move the spacer 636 of the retaining unit 630 to the actuated position. This positions the spacer 636 of the retaining unit 630 closer to the second end of the shaft 650 of the clevis pin 632, and raises the spacer 636 above the edge of the bottom side 540 of the axle housing 500 and the third pillar 518(3) (as shown in FIG. 6B) such that the shaft 650 of the clevis pin 632 may slide past the third pillar 518(3) in the gap between the third pillar 518(3) and top side 530 of the axle housing 500 (as shown in FIG. 6C). The retaining unit 630 may slide along channel 560 until the retaining unit 630 is aligned with the outermost slot 514 (as shown in FIGS. 6D-6G) for placement of the wheel 700 on the axle 600. The retaining unit 630 may be moved to the innermost slot 512 of the axle housing 500 (shown in FIGS. 6H-6J) for use of the collapsible support structure 10 as described below. The first pillar 518(1) may engage the retaining unit 630 to prevent the axle 600 from sliding completely out of the channel 560, and may subsequently align the retaining unit 630 with the outermost slot 514. As the axle 600 is sliding along the channel 560 of the axle housing 500, the spacer 636 of the retaining unit 630 is in the unactuated position.

Figure 6F:
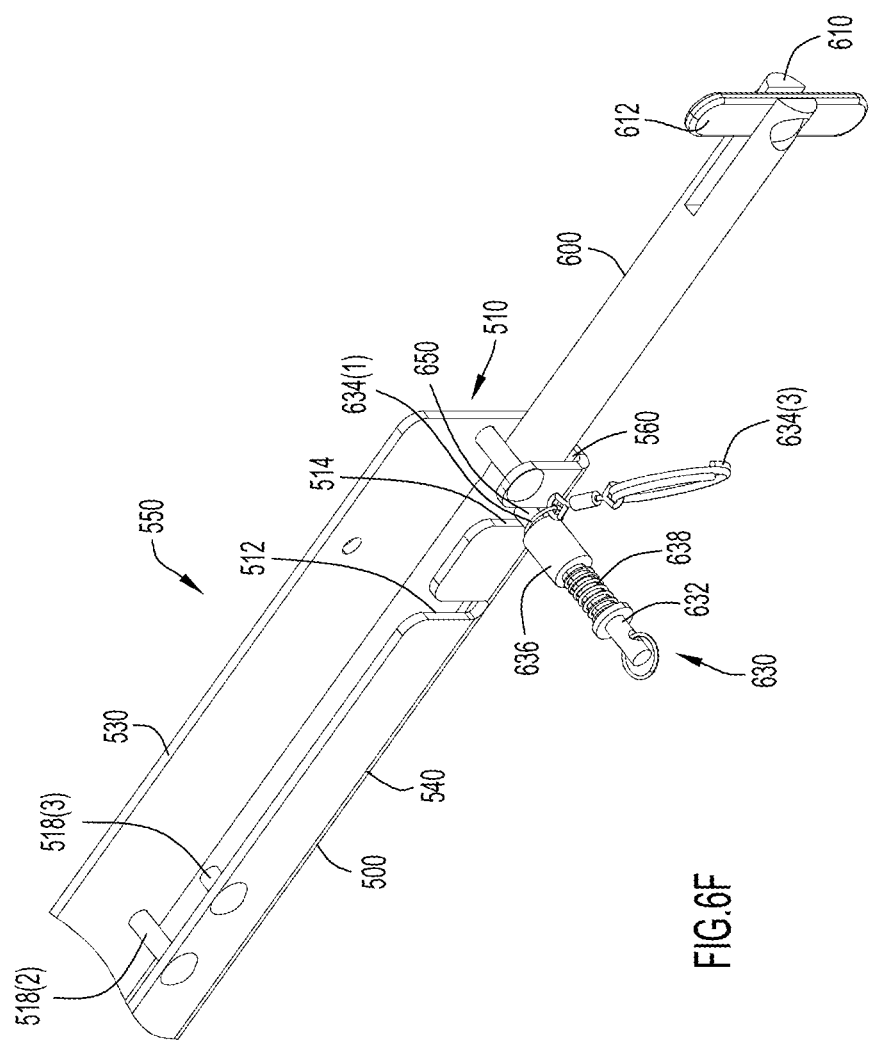
FIG. 6F illustrates a perspective view of the end of the axle assembly illustrated in FIG. 6A, the end of the axle assembly shown in isolation with the retaining unit in an actuated position and the axle deployed (without a wheel coupled to the axle).
Figure 6G:
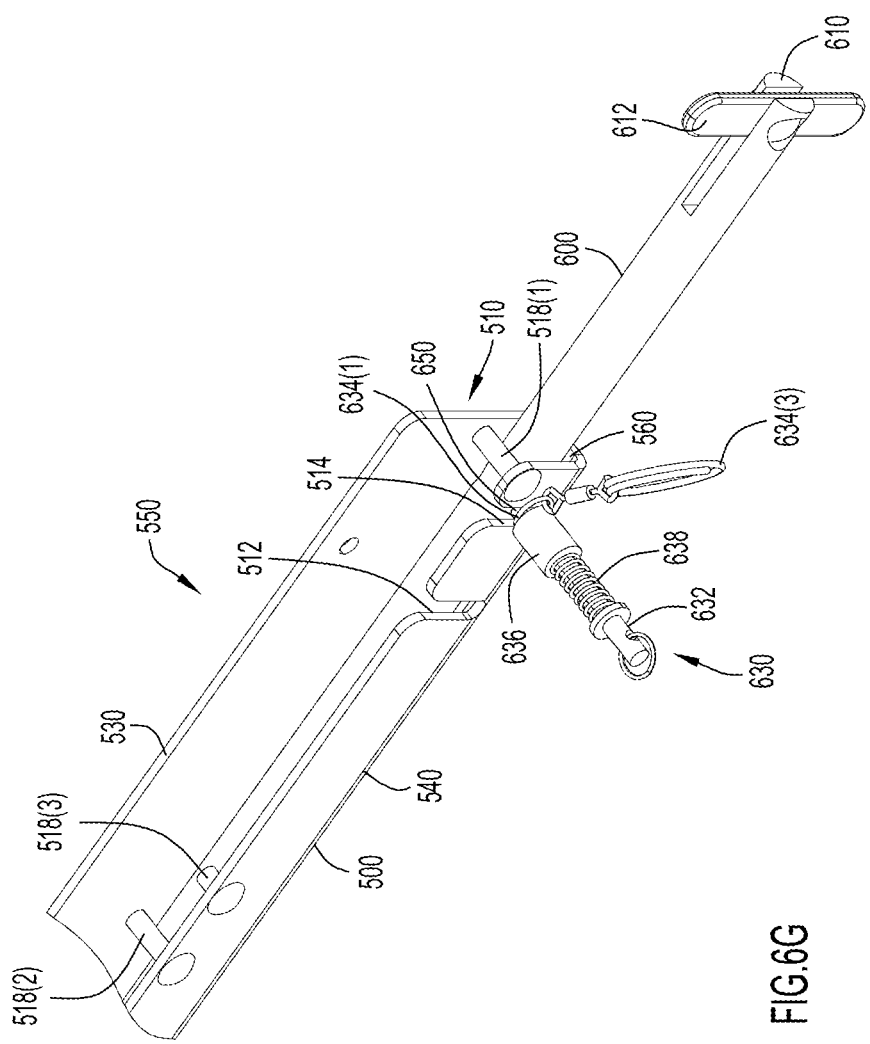
FIG. 6G illustrates a perspective view of the end of the axle assembly illustrated in FIG. 6A, the end of the axle assembly shown in isolation with the retaining unit in an unactuated position and the axle deployed (without a wheel coupled to the axle).
Figure 6J:
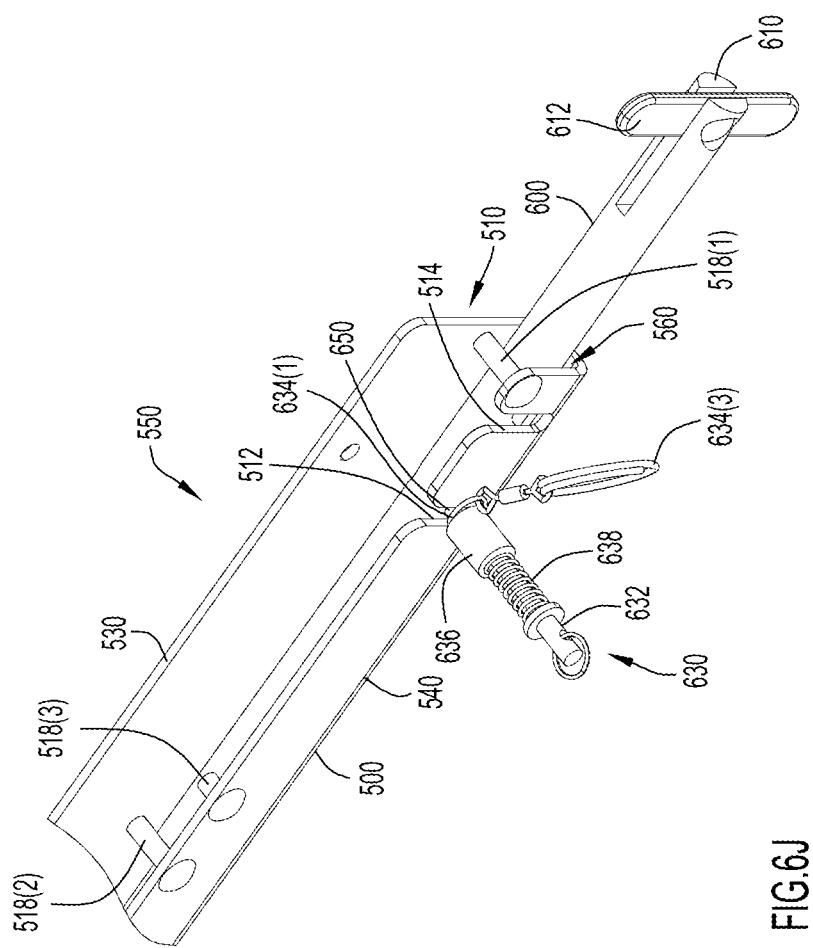
FIG. 6J illustrates a perspective view of the end of the axle assembly illustrated in FIG. 6A, the end of the axle assembly shown in isolation with the retaining unit in an unactuated position and the axle deployed (without a wheel coupled to the axle).

Since the outermost and innermost slots 514, 512 are substantially identical to one another, the description associated with FIGS. 6D-6G and the steps for securing the retaining unit 630 within the outermost slot 514 also apply to how to secure the retaining unit 630 within the innermost slot 512 as illustrated in FIGS. 6H-6J.

As best shown in FIGS. 6F and 6I, the spacer 636 of the retaining unit 630 may be wider than the innermost and outermost slots 512, 514. However, the shaft 650 of the clevis pin 632 of the retaining unit 630 is not as wide as the innermost and outermost slots 512, 514. Thus, when the retaining unit 630 of the axle 600 is aligned with one of the innermost and outermost slots 512, 514, and the spacer 636 is in the unactuated position, the spacer 636 prevents the axle 600 from rotating within the channel 560 of the axle housing 500 such that the retaining unit 630 slides into the slots 512, 514. Once the retaining unit 630 is aligned with one of the innermost or outermost slots 512, 514 of the axle housing 500, the user may actuate the retaining unit 630 by pulling on the third split ring 634(3) of the retaining unit 630 to move the spacer 636 of the retaining unit 630 to the actuated position. This positions the spacer 636 of the retaining unit 630 closer to the second end of the shaft 650 of the clevis pin 632, and raises the spacer 636 above the edge of the bottom side 540 of the axle housing 500 such that the shaft 650 of the clevis pin 632 may be inserted into the innermost slot 512 or outermost slot 514 (as shown in FIGS. 6F and 6I). Once the shaft 650 of the clevis pin 632 is disposed in one of the slots 512, 514, the user may release the third split ring 634(3), which allows the resilient member 638 to bias the first split ring 634(1) and spacer 636 toward the bottom side 540 of the axle housing 500 (i.e., sandwiching the bottom side 540 of the axle housing 500 between the spacer 636/first split ring 634(1) and the axle 600 as shown in FIGS. 6G and 6J). With the resilient member 638 biasing the first split ring 634(1) and spacer 636 toward the bottom side 540 of the axle housing 500, the axle 600 is prevented from rotating within the channel 560. Thus, the shaft 650 of the clevis pin of the retaining unit 630 is prevented from sliding out of the slot 512, 514 within which the shaft 650 of the clevis pin 632 of the retaining unit 630 is disposed. In other words, the retaining unit 630 secures the axle 600 in one of the two positions (i.e., the retaining unit 630 being disposed within the outermost slot 514 or the retaining unit being disposed within the innermost slot 512) until the user engages the third split ring 634(3) to translate the spacer 636 to the actuated position again.

The steps described above with respect to FIGS. 6A-6J, when performed in reverse, facilitate the rotation of the axle 600 within the channel 560 such that the shaft 650 of the clevis pin 632 of the retaining unit 630 slides out of one of the slots 512, 514, and facilitates repositioning the axle 600 to the storage position within the axle housing 500.

When initially deploying the axle 600 from the storage position, the user may first align the retaining unit 630 with the outermost slot 514, and then, as described above, actuate the retaining unit 630 and rotate the axle 600 to secure the axle 600 in a loading position where the shaft 650 of the clevis pin 632 is disposed in the outermost slot 514 (FIG. 6G). When the axle 600 is in this loading position, the end 610 of the axle 600 containing the rotating tab 612 may extend from the end 510 of the axle housing 500, which allows the user to then place a wheel 700 onto the axle 600 by aligning the central opening in hub 710 with tab 612 and axle 600 and sliding the wheel over tab 612 and the first end 610 of the axle 600. Once the wheel 700 is slid over the first end 610 of the axle, the rotatable tab 612 may be rotated about the axis extending through the first end 610 of the axle to the transverse position (best shown in FIGS. 4B, 6D-6G) to secure the wheel 700 to the axle 600 (i.e., preventing the wheel 700 from sliding beyond the first end 610 of the axle 600). Once the wheel 700 is secured to the axle 600, the user may actuate the retaining unit 630 to allow the axle 600 to rotate within the channel 560 such that the shaft 650 of the clevis pin 632 is no longer disposed within the outermost slot 514. The user may then slide the axle 600 partially into the channel 560 of the axle housing 500 until the retaining unit 630 is aligned with the innermost slot 512. As previously explained, once aligned with the innermost slot 512, the user may actuate the retaining unit 630 and rotate the axle 600 to secure the axle 600 in the deployed position where the shaft 650 of the clevis pin 632 is disposed in the innermost slot 512 (FIG. 6J). When in this deployed position, the axle 600 secures the hub 710 of the wheel 700 proximate to both the end 510 of the axle housing 500 and the rotatable tab 612. Thus, the deployed position of the axle 600 minimizes the amount the wheel 700 is able to slide back and forth on the axle 600, thereby maximizing its rotating efficiency on the axle 600.

Figure 7:
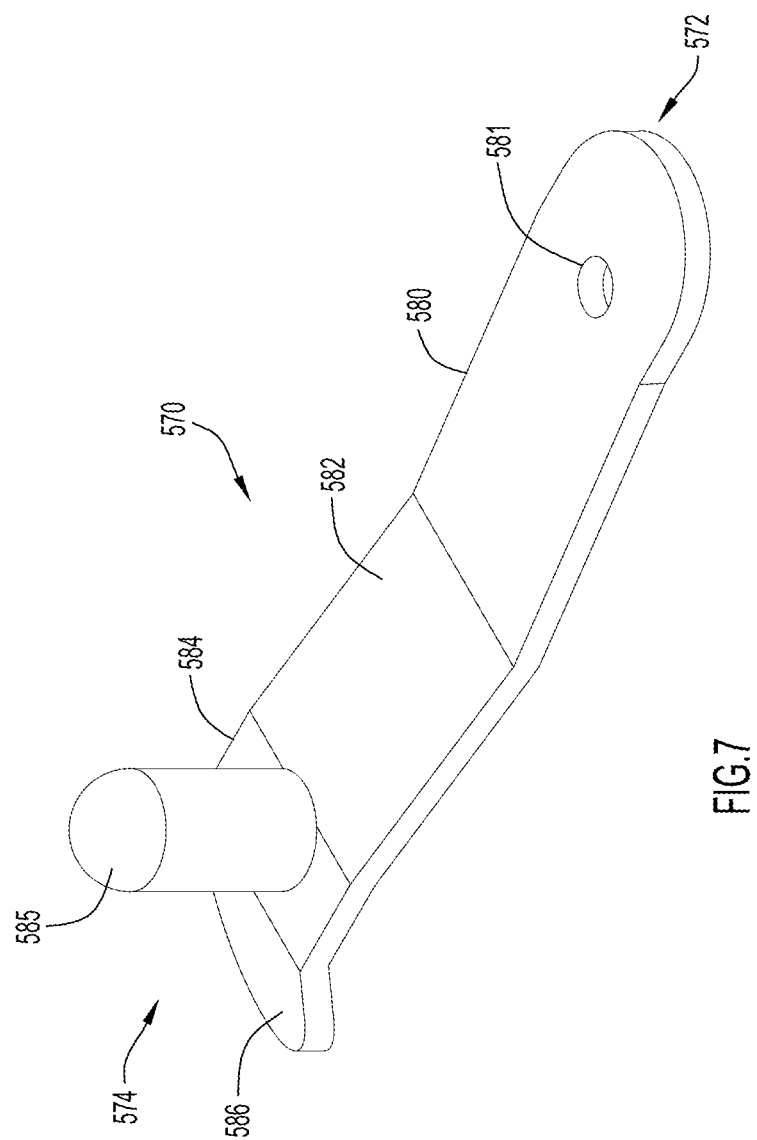
FIG. 7 illustrates a perspective view of a snap button for the axle assembly of the collapsible support structure according to an alternative embodiment.

Turning to FIG. 7, illustrated is a perspective view of a snap button 570 that may be utilized on both the first end 510 and the second end of the axle housing 500 in an alternative embodiment of the present invention. The snap button 570 is an elongate member that includes a first end 572 and an opposite second end 574. The snap button 570, moreover, includes a first segment 580, second segment 582, third segment 584, and fourth segment 586. Each of the segments 580, 582, 584, 586 may be oriented at an offset angle with respect to its adjacent segments 580, 582, 584, 586. In other words, the second segment 582, which is coupled to the first segment 580, may extend in a direction that is angularly offset from the first segment 580 such that the first segment 580 and the second segment 582 are not parallel with, nor aligned within the same plane as, one another. Similarly, the third segment 584, which is coupled to the second segment 582, may extend in a direction that is angularly offset from the second segment 582 such that the second segment 582 and the third segment 584 are not parallel with, nor aligned within the same plane as, one another. Finally, the fourth segment 586, which is coupled to the third segment 584, may extend in a direction that is angularly offset from the third segment 584 such that the third segment 584 and the fourth segment 586 are not parallel with, nor aligned within the same plane as, one another. Thus, as illustrated in FIG. 7, the snap button 570 may have a substantially arch-like shape between the first end 572 and the second end 574 of the snap button 570. In other embodiments, the snap button 570 may have a flat shape. Disposed on the first segment 580 proximate to the first end 572 of the snap button 570 is an aperture or opening 581, while disposed on the third segment 584 is a protrusion or head 585 of the snap button 570. The head 585 extends from the planar surface of the third segment 584 of the snap button 570. In other embodiments of the snap button 570, the head 585 may be located on a different segment or located at a different position along the snap button 570.

Figure 8A:
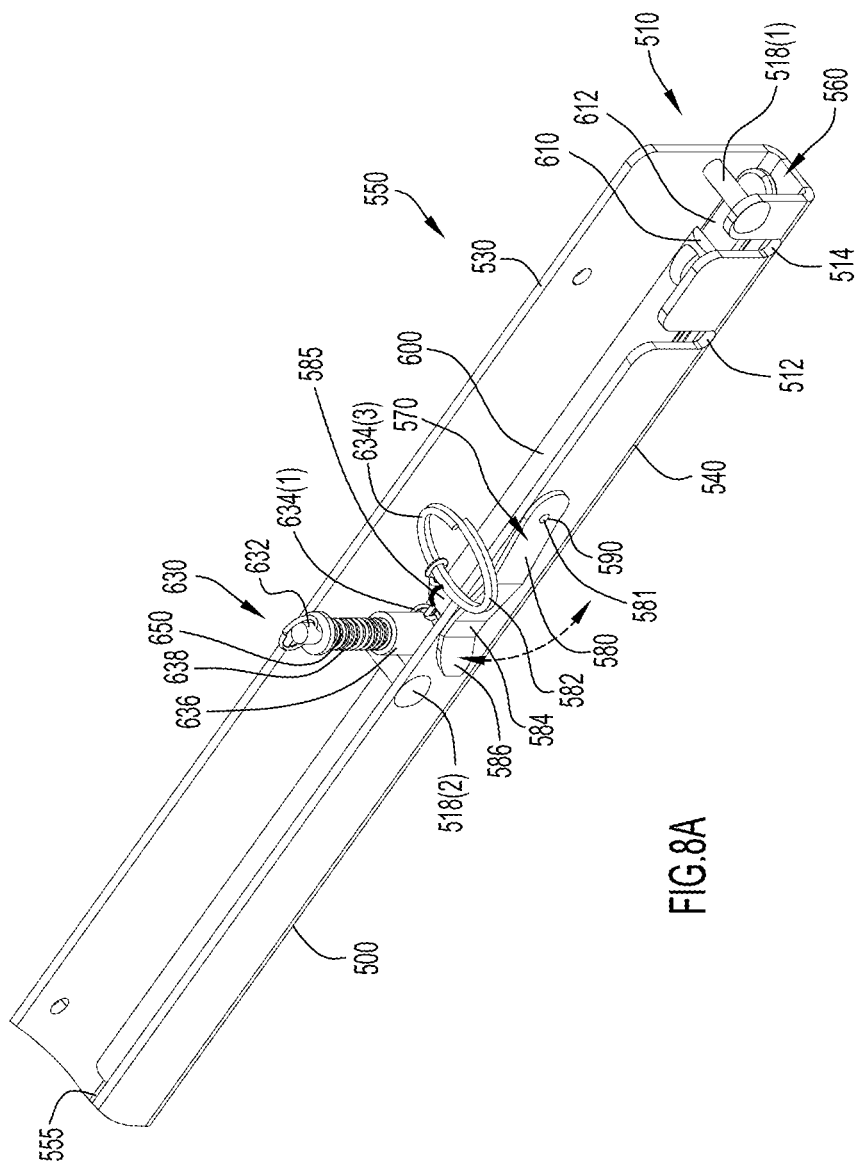
FIG. 8A illustrates a perspective view of the axle assembly (i.e., axle housing and one of the axles) of the collapsible support structure, one end of the axle assembly shown in isolation with the axle in a stowed/storage position.

The snap button 570, as illustrated in FIGS. 7 and 8A-8F, may be coupled to the bottom side 540 of the axle housing 500 proximate to the second pillar 518(2) (e.g., and may be used in place of, or in addition to, third pillar 518(3) in alternative embodiments). A fastener 590 that extends through the opening 581 of the first segment 580 of the snap button 570 may couple the snap button 570 to the bottom side 540 of the axle housing 500. Due to the shape and angular orientations of the various segments 580, 582, 584, 586 of the snap button 570, the snap button 570 may be biased to the axle retaining position, which is the position of the snap button 570 that is illustrated in FIG. 8A. When in the axle retaining position, the head 585 of the snap button 570 extends through the bottom side 540 of the axle housing 500 and into the channel 560. A user may engage the fourth segment 586 to bend or manipulate the snap button 570 to the axle releasing position (not shown), where the amount that the head 585 extends into the channel 560 is reduced or eliminated when compared to the axle retaining position. When the user releases, or is no longer engaged with the fourth segment 586, the snap button 570 is biased back to the axle retaining position.

Turning to FIGS. 8A-8F, illustrated are isolated views of the first end 510 of the axle assembly 550 with the axle 600 slidably disposed within the channel 560 of the axle housing 500 according to an alternative embodiment. FIGS. 8A-8F further illustrate the steps taken to deploy the axle 600. As illustrated in FIG. 8A, the axle 600 is slidably disposed within the channel 560 of the axle housing 500 in a stowed or storage position. When the axle 600 is disposed in the storage position and the snap button 570 is in the axle retaining position, the retaining unit 630 of the axle 600 may be disposed between the head 585 of the snap button 570 protruding into the channel 560 of the axle housing 500 and the second pillar 518(2) of the axle housing 500. Thus, the head 585 of the snap button 570 serves to prevent the axle 600 from sliding along the channel toward the axle deployed position. When the axle 600 is in the storage position, the end 610 of the axle 600 containing the rotatable tab 612 is disposed within the channel 560 of the axle housing 500. Moreover, the rotatable tab 612 is rotated to the aligned position, and is also disposed within the channel 560 of the axle housing 500. Thus, as illustrated, neither the first end 610 of the axle 600 nor the rotatable tab 612 may extend from the end 510 of the axle housing 500 when the axle 600 is in the storage position.

Figure 8B:
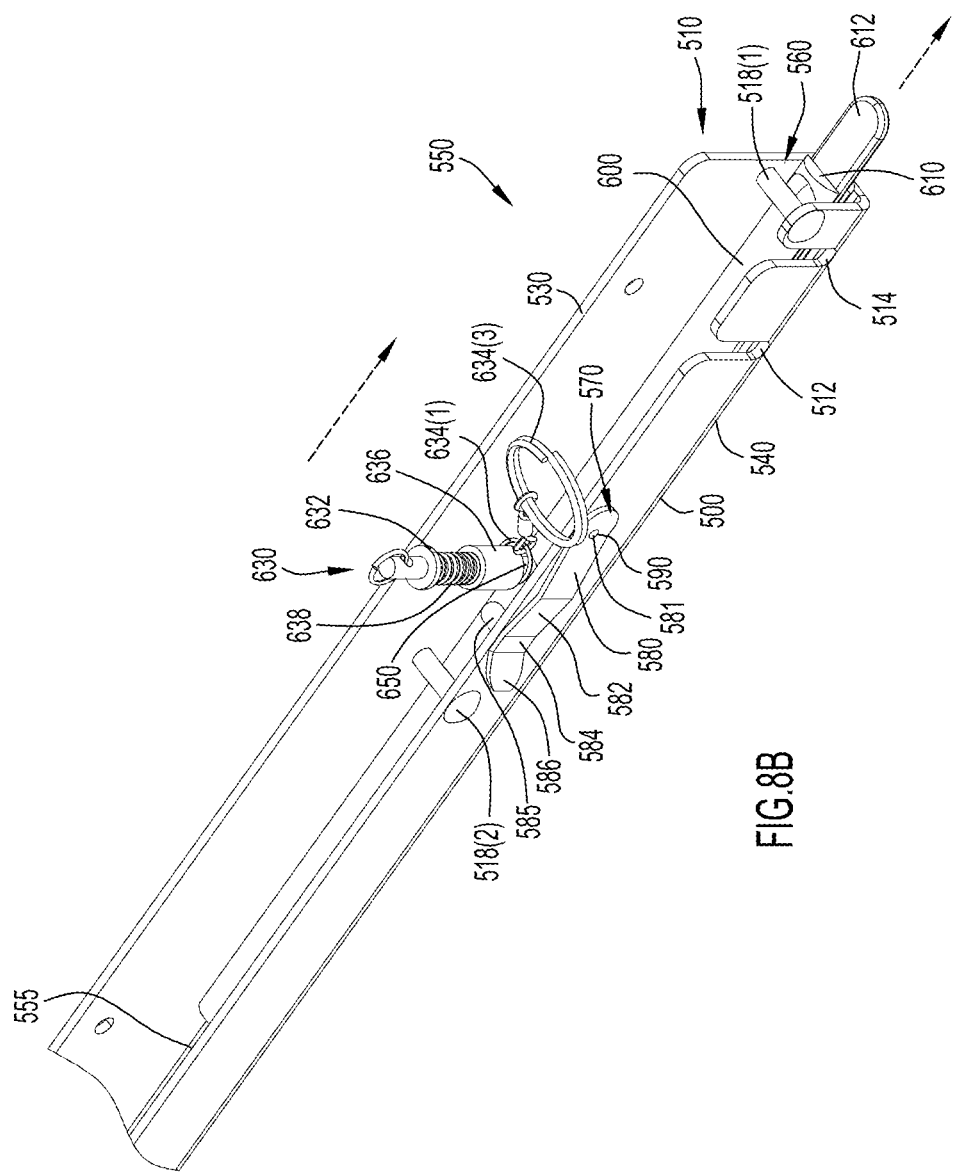
FIG. 8B illustrates a perspective view of the end of the axle assembly illustrated in FIG. 8A, the end of the axle assembly shown in isolation with the axle in the process of being deployed (i.e., the axle sliding from the from the stowed/storage position to a deployed position) and the rotatable tab of the axle being positioned in the aligned/stowed position.
Figure 8C:
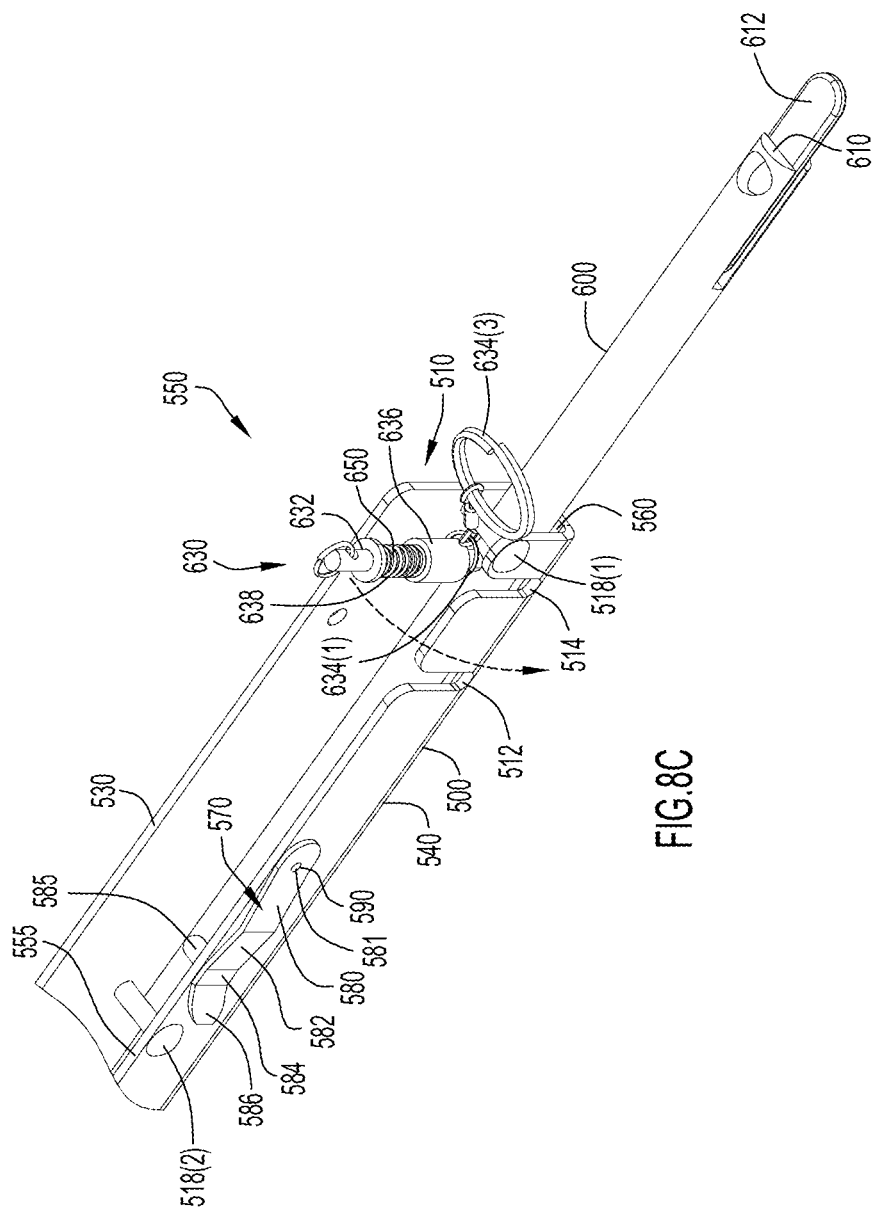
FIG. 8C illustrates a perspective view of the end of the axle assembly illustrated in FIG. 8A, the end of the axle assembly shown in isolation with the axle in the process of being deployed and aligned horizontally along the axle housing with the outermost slot of the axle housing, and the rotatable tab of the axle being positioned in the aligned/stowed position.
Figure 8D:
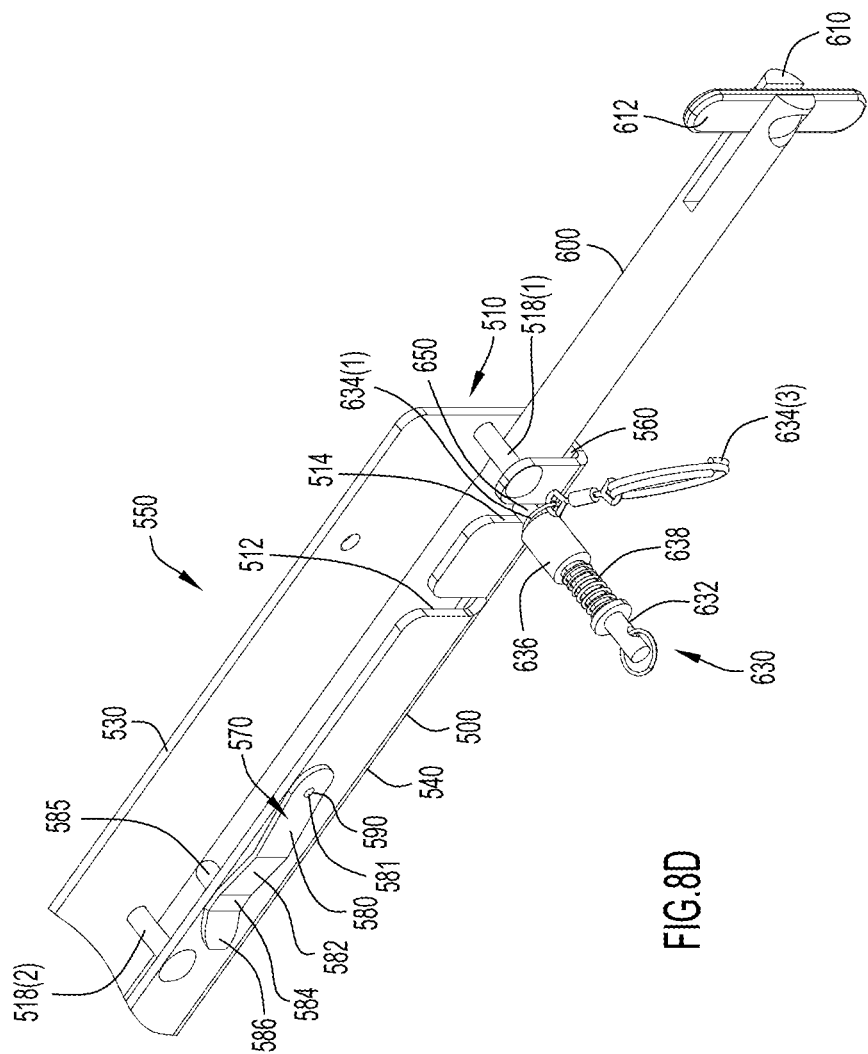
FIG. 8D illustrates a perspective view of the end of the axle assembly illustrated in FIG. 8C, the end of the axle assembly shown in isolation with the axle deployed (without a wheel coupled to the axle).

When a user wishes to deploy the axle 600 and secure a wheel 700 to the axle 600, the snap button 570 must be flexed or manipulated from the axle retaining position to the axle releasing position to at least partially slide the head 585 of the snap button 570 out of the channel 560 of the axle housing 500 (i.e., to at least reduce the amount that the head 585 of the snap button 570 extends into the channel 560 of the axle housing 500). Once the snap button 570 has been manipulated to the axle releasing position, the retaining unit 630 of the axle 600 may slide past the head 585 of the snap button 570 (as shown in FIG. 8B) until the retaining unit 630 is aligned with and then disposed within the outermost slot 514 (as shown in FIGS. 8C and 8D) for placement of the wheel 700 on the axle 600. The retaining unit 630 may be moved to the innermost slot 512 of the axle housing 500 (shown in FIGS. 8E and 8F) for use of the collapsible support structure 10 as described below. The first pillar 518(1) may engage the retaining unit 630 to prevent the axle 600 from sliding completely out of the channel 560, and may subsequently help to align the retaining unit 630 with the outermost slot 514. As the axle 600 is sliding along the channel 560 of the axle housing 500, the spacer 636 of the retaining unit 630 is in the unactuated position.

Figure 8E:
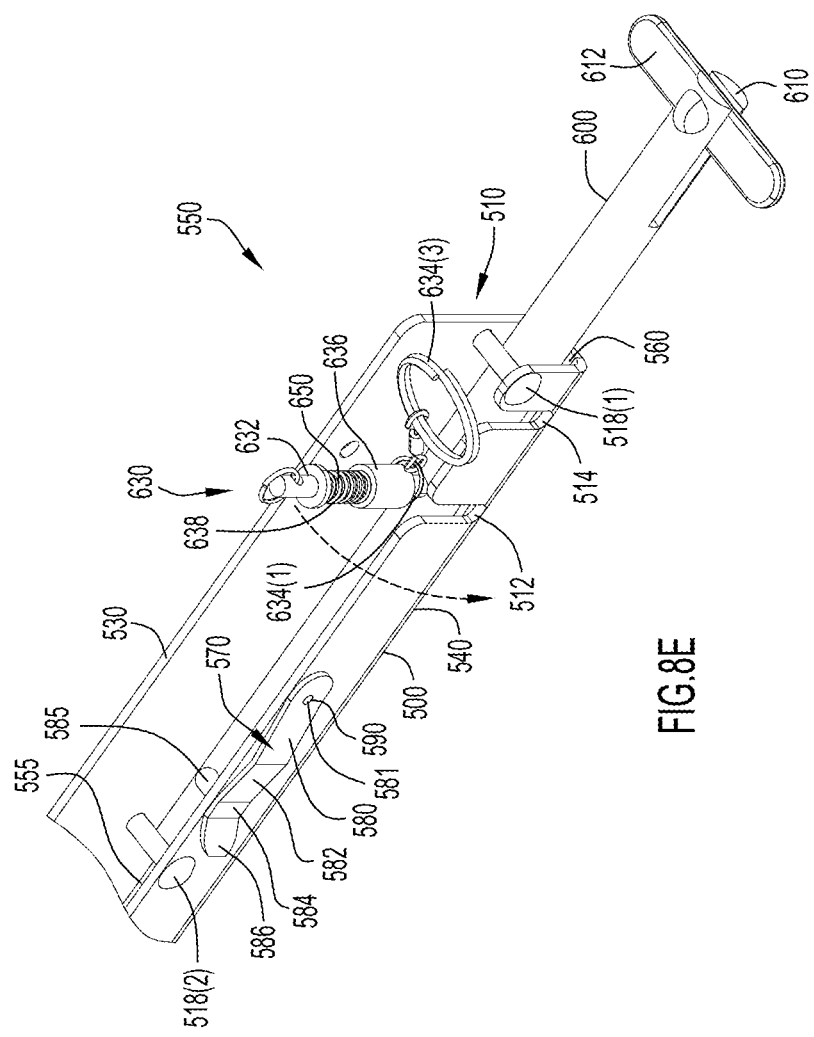
FIG. 8E illustrates a perspective view of the end of the axle assembly illustrated in FIG. 8A, the end of the axle assembly shown in isolation with the axle in the process of being deployed and aligned horizontally along the axle housing with the innermost slot of the axle housing, and the rotatable tab of the axle being positioned in the transverse/deployed position.
Figure 8F:
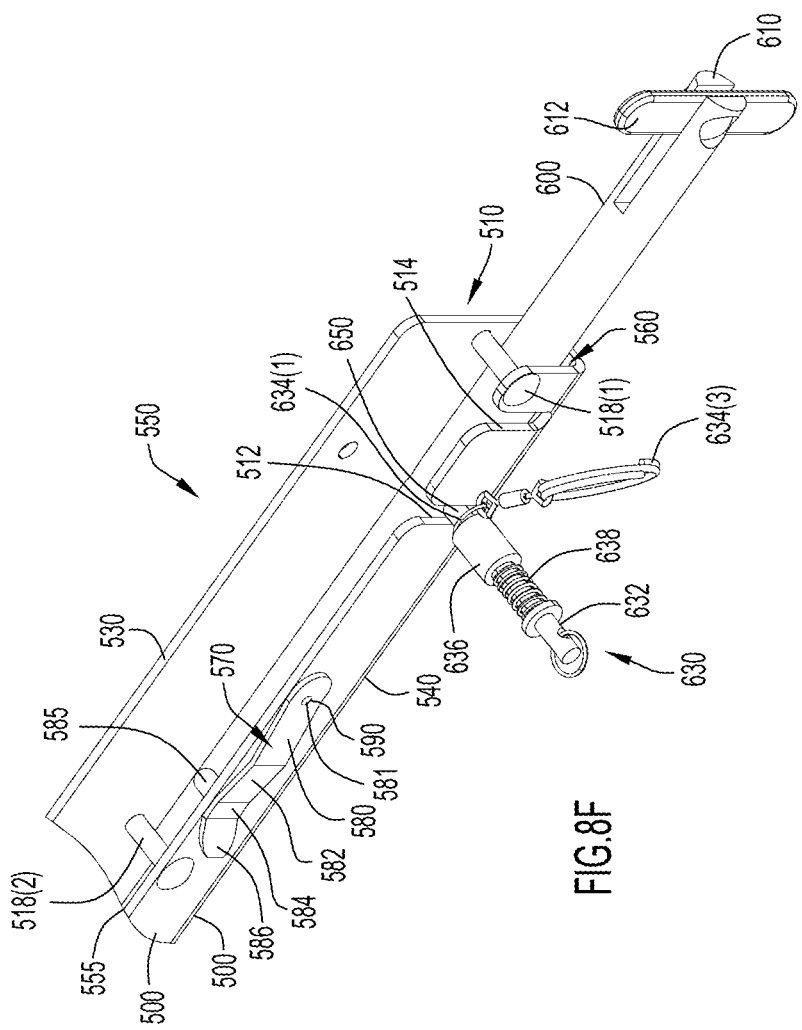
FIG. 8F illustrates a perspective view of the end of the axle assembly illustrated in FIG. 8E, the end of the axle assembly shown in isolation with the axle deployed (without a wheel coupled to the axle).

Since the outermost and innermost slots 514, 512 are substantially identical to one another, the description associated with FIGS. 8C and 8D and the steps for securing the retaining unit 630 within the outermost slot 514 also apply to how to secure the retaining unit 630 within the innermost slot 512 as illustrated in FIGS. 8E and 8F.

As best shown in FIGS. 8C-8F, the diameter or width of spacer 636 of the retaining unit 630 may be larger or wider than the innermost and outermost slots 512, 514. However, the diameter of shaft 650 of the clevis pin 632 of the retaining unit 630 is not as large as the widths of innermost and outermost slots 512, 514. Thus, when the retaining unit 630 of the axle 600 is aligned with one of the innermost and outermost slots 512, 514, and the spacer 636 is in the unactuated position, the spacer 636 prevents the axle 600 from rotating within the channel 560 of the axle housing 500 such that the retaining unit 630 remains disposed within the slots 512, 514. Once the retaining unit 630 is aligned with one of the innermost or outermost slots 512, 514 of the axle housing 500, the user may actuate the retaining unit 630 by pulling on the third split ring 634(3) of the retaining unit 630 to move the spacer 636 of the retaining unit 630 to the actuated position. This positions the spacer 636 of the retaining unit 630 closer to the second end of the shaft 650 of the clevis pin 632, and raises the spacer 636 above the edge of the bottom side 540 of the axle housing 500 such that the shaft 650 of the clevis pin 632 may be inserted into the innermost slot 512 or outermost slot 514. Once the shaft 650 of the clevis pin 632 is disposed in one of the slots 512, 514, the user may release the third split ring 634(3), which allows the resilient member 638 to bias the first split ring 634(1) and spacer 636 toward the bottom side 540 of the axle housing 500 (i.e., sandwiching the bottom side 540 of the axle housing 500 between the spacer 636/first split ring 634(1) and the axle 600 as shown in FIGS. 8D and 8F). With the resilient member 638 biasing the first split ring 634(1) and spacer 636 toward the bottom side 540 of the axle housing 500, the axle 600 is prevented from rotating within the channel 560. Thus, the shaft 650 of the clevis pin of the retaining unit 630 is prevented from being rotated out of the slot 512, 514 within which the shaft 650 of the clevis pin 632 of the retaining unit 630 is disposed. In other words, the retaining unit 630 secures the axle 600 in one of the two positions (i.e., the retaining unit 630 being disposed within the outermost slot 514 or the retaining unit being disposed within the innermost slot 512) until the user engages the third split ring 634(3) to translate the spacer 636 to the actuated position again.

The steps described above with respect to FIGS. 8A-8F, when performed in reverse, facilitate the rotation of the axle 600 within the channel 560 such that the shaft 650 of the clevis pin 632 of the retaining unit 630 slides out of one of the slots 512, 514, and facilitates repositioning the axle 600 to the storage position within the axle housing 500.

When initially deploying the axle 600 from the storage position, the user may first align the retaining unit 630 with the outermost slot 514, and then, as described above, actuate the retaining unit 630 and rotate the axle 600 to secure the axle 600 in a loading position where the shaft 650 of the clevis pin 632 is disposed in the outermost slot 514 (FIG. 8D). When the axle 600 is in this loading position, the end 610 of the axle 600 containing the rotating tab 612 may extend from the end 510 of the axle housing 500, which allows the user to then place a wheel 700 onto the axle 600 by aligning the central opening in hub 710 with tab 612 and axle 600 and sliding the wheel over tab 612 and the first end 610 of the axle 600. Once the wheel 700 is slid over the first end 610 of the axle, the rotatable tab 612 may be rotated about the axis extending through the first end 610 of the axle to the transverse position (best shown in FIGS. 4B and 8C-8F) to secure the wheel 700 to the axle 600 (i.e., preventing the wheel 700 from sliding beyond the first end 610 of the axle 600). Once the wheel 700 is secured to the axle 600, the user may actuate the retaining unit 630 to allow the axle 600 to rotate within the channel 560 such that the shaft 650 of the clevis pin 632 is no longer disposed within the outermost slot 514. The user may then slide the axle 600 partially into the channel 560 of the axle housing 500 until the retaining unit 630 is aligned with the innermost slot 512. As previously explained, once aligned with the innermost slot 512, the user may actuate the retaining unit 630 and rotate the axle 600 to secure the axle 600 in the deployed position where the shaft 650 of the clevis pin 632 is disposed in the innermost slot 512 (FIG. 8F). When in this deployed position, the axle 600 secures the hub 710 of the wheel 700 proximate to both the end 510 of the axle housing 500 and the rotatable tab 612. Thus, the deployed position of the axle 600 minimizes the amount the wheel 700 is able to slide back and forth on the axle 600, thereby maximizing its rotating efficiency on the axle 600.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Similarly, various words and phrases, such as "perpendicular", and "parallel", are used to describe the location of the embodiments' components in space, direction, orientation or in relation to other components. The word "slot" is used to describe a slot, gap or similar opening, channel or passage. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the apparatuses described herein, or portions thereof, may be fabricated from any suitable material or combination of materials, such as, but not limited to, metals, wood, cardboard, plastics, etc., as well as derivatives thereof, and combinations thereof.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", "proximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. An axle assembly for a collapsible structure, the axle assembly comprising:
    an axle housing, the axle housing including a first end and a second end, the axle housing further comprising:
      a first planar portion,
      a second planar portion coupled to the first planar portion,
      a third planar portion coupled to the second planar portion and oriented parallel to the first planar portion, the first planar portion, the second planar portion, and the third planar portion collectively defining a channel extending between the first end and the second end,
      a first slot disposed on the third planar portion proximate to the first end of the axle housing; and
    an axle slidably disposed within the channel of the axle housing, the axle including a first axle end, an opposite second axle end, and a retaining unit extending from the axle at a location between the first axle end and the second axle end, the retaining unit including a shaft configured to fit within the first slot and a resilient member coupled to the shaft to secure the retaining unit in the first slot.

2. The axle assembly of claim 1, wherein the axle is repositionable about the channel of the axle housing between a storage position, where the first axle end is disposed within the channel, and a deployed position, where the first axle end is disposed a first distance from the first end of the axle housing external of the channel.

3. The axle assembly of claim 1, wherein the axle further comprises:
    a tab rotatably coupled to the first axle end, the tab being rotatable about an axis that extends through the first axle end between a first position, where the tab is transversely oriented with respect to the axle, and a second position, where the tab is collinear with the axle.

4. The axle assembly of claim 2, wherein, when the axle is in the deployed position, the retaining unit of the axle is disposed within the first slot.

5. The axle assembly of claim 2, wherein the deployed position is a first deployed position, and the axle housing further comprising:
    a second slot disposed on the third planar portion, the second slot being disposed more proximate to the first end of the axle housing than the first slot,
    wherein the axle is further repositionable to a second deployed position, when the axle is in the second deployed position, the retaining unit of the axle is disposed within the second slot and the first axle end is disposed a second distance from the first end of the axle housing external of the channel, the second distance being greater than the first distance, and
    wherein, when the axle is in the second deployed position and a wheel is disposed on the axle, a tab coupled to the first axle end is capable of rotating between a first position and a second position.

6. The axle assembly of claim 2, the axle housing further comprising:
    a first pillar extending between the first planar portion and the third planar portion; and
    a second pillar disposed between the first end of the axle housing and the first pillar and partially extending between the first planar portion and the third planar portion;
    wherein, when the first axle end is disposed within the channel or closely proximate to an end of the channel, the retaining unit is disposed between the first and second pillars and the second pillar engages the retaining unit of the axle to prevent the axle from sliding out of the storage position.

7. The axle assembly of claim 6, wherein the retaining unit further includes a spacer disposed on the shaft and a ring coupled to the shaft to move the spacer against biasing of the resilient member and place the retaining unit in an actuated position, wherein, when the axle is in the storage position and the retaining unit is in the actuated position, the second pillar no longer engages the retaining unit of the axle to enable the axle to slide out of the storage position to the deployed position.

8. The axle assembly of claim 2, the axle housing further comprising:
    a snap button disposed on the third planar portion, the first slot being disposed more proximate to the first end of the axle housing than the snap button, the snap button being configurable between a retaining position, where a head of the snap button extends through the third planar portion and into the channel of the axle housing a first length, and a releasing position, where the head of the snap button extends into the channel of the axle housing a second length that is less than the first length, and
    wherein, when the axle is in the storage position and the snap button is in the retaining position, the head of the snap button engages the retaining unit of the axle to prevent the axle from sliding out of the storage position.

9. The axle assembly of claim 8, wherein, when the axle is in the storage position and the snap button is in the releasing position, the head of the snap button no longer engages the retaining unit of the axle to enable the axle to slide out of the storage position to the deployed position.

10. The axle assembly of claim 1, wherein the axle assembly is disposed on the collapsible structure.

11. The axle assembly of claim 10, wherein the collapsible structure includes one of a cart, a chair, a wagon, a wheelbarrow, a stroller, and a trailer.

12. The axle assembly of claim 1, wherein the resilient member includes a spring.

13. The axle assembly of claim 1, wherein the retaining unit further includes a spacer disposed on the shaft, and the resilient member biases the spacer along the shaft toward the axle housing to secure the retaining unit in the first slot.

14. The axle assembly of claim 13, wherein the retaining unit further includes a pin containing the shaft, the pin including a head wider than the first slot and disposed on a first side of the first slot, wherein the shaft is disposed through the first slot with the resilient member biasing the spacer toward an opposing side of the first slot.

15. The axle assembly of claim 13, wherein the retaining unit further includes a ring and a washer coupled to the shaft, the washer disposed proximate the resilient member along the shaft and the ring disposed proximate the washer along the shaft, the ring configured to maintain the washer, resilient member, and spacer along the shaft.

16. The axle assembly of claim 15, wherein the ring is inserted through an aperture within the shaft.

* * * * *